United States Patent [19]

Ueshima et al.

[11] Patent Number: 5,810,920
[45] Date of Patent: Sep. 22, 1998

[54] METHOD FOR TREATING WASTES

[75] Inventors: Kenji Ueshima; Noboru Ikitsu; Takuji Nomura; Takashi Funahashi; Masakazu Uekita, all of Kobe, Japan

[73] Assignee: Kanegafuchi Kagaku Kogyo Kabushiki Kaisha, Osaka, Japan

[21] Appl. No.: 854,529

[22] Filed: May 12, 1997

Related U.S. Application Data

[60] Continuation of Ser. No. 512,637, Aug. 8, 1995, abandoned, which is a division of Ser. No. 364,194, Dec. 27, 1994, abandoned.

[30] Foreign Application Priority Data

Dec. 28, 1993 [JP] Japan .................................. 5-337888
Jan. 28, 1994 [JP] Japan ...................................... 6-8031
Jan. 28, 1994 [JP] Japan ...................................... 6-8032
Apr. 28, 1994 [JP] Japan ..................................... 6-92325

[51] Int. Cl.$^6$ .............................. C04B 18/04; A62D 3/00
[52] U.S. Cl. ......................... 106/697; 106/705; 106/706; 106/708; 106/DIG. 1; 588/256; 588/257
[58] Field of Search ..................................... 106/697, 705, 106/706, 708, 718, 736, 811, 812, 815, DIG. 1, DIG. 4, 738; 588/256, 257

[56] References Cited

U.S. PATENT DOCUMENTS

| 4,209,335 | 6/1980 | Katayama et al. ........................ 160/696 |
| 4,432,666 | 2/1984 | Frey ......................................... 106/696 |
| 5,362,319 | 11/1994 | Johnson .................................. 106/697 |
| 5,376,283 | 12/1994 | Hooykaas ................................ 106/697 |

*Primary Examiner*—Michael Marcheschi
*Attorney, Agent, or Firm*—Armstrong, Westerman, Hattori, McLeland & Naughton

[57] ABSTRACT

To treat waste containing harmful metals such as lead, cadmium, mercury, chromium, copper, nickel, zinc, etc., the waste is mixed with a treating agent containing, as the essential constituent component, solid acid(s) and/or cement and additionally a caking inhibitor, kneaded with water where necessary, then solidified by curing. Harmful metals are thereby stabilized in the thus-solidified cakes and are not released therefrom.

14 Claims, No Drawings

METHOD FOR TREATING WASTES

This application is a continuation of application Ser. No. 08/512,637 filed Aug. 8, 1995, now abandoned, which was a division of parent application Ser. No. 08/364,194 filed Dec. 27, 1994, now abandoned.

BACKGROUND OF THE INVENTION

1. Field of the Invention

The present invention relates to a waste-treating agent, which is effective for stabilizing waste containing harmful heavy metals, etc., and to a method for treating waste using it.

2. Prior Art

Recently, about 48,000,000 tons/year (in 1988) of general waste and about 310,000,000 tons/year (in 1985) of industrial waste were discarded in Japan. It is estimated that the former general waste will reach about 80,000,000 tons/year and the latter industrial waste about 600,000,000 tons/year in the year 2000. Of these, about 70% of general waste are incinerated while about 20% thereof are directly discarded. On the other hand, about 40% of the industrial waste is recycled and about 30% is incinerated to reduce the volume and is then discarded, while about 30% is directly discarded in final garbage pits. Since the general waste and industrial waste incinerated contain large amounts of harmful heavy metals, the legal controls on the treatment of these are being reinforced noticeably.

As for garbage pits in urban areas, for example, color printed paper or cellophane in waste discarded into these pits contain cadmium (Cd), lead (Pb), chromium (Cr), mercury (Hg), arsenic (As), copper (Cu), etc., while plastics discarded there into contain cadmium, lead, zinc (Zn), chromium, mercury, arsenic, etc. Incineration of such waste yields the ashes of concentrated heavy metals. In many waste incineration systems, recently, the ashes are fractionated into main ash comprising cinders from waste and fly ash that is collected in bag filters or the like and the thus-fractionated ashes are collected separately. Both main ash and fly ash contain heavy metals, but fly ash easily releases heavy metals when it is discarded as it is. This occurs for the following reasons: Slaked lime or quick lime is introduced with air into the exhaust ducts in incineration systems so as to trap the hydrogen chloride gas generated by the incineration of the waste therein. The slaked lime or quick lime is bonded to the hydrogen chloride gas generated to form calcium chloride, by which the hydrogen chloride gas concentration in the exhaust gas from the incineration system is lowered. However, since the non-reacted slaked lime or quick lime remains present in the fly ash, the fly ash becomes highly alkaline and has a pH of 12 or higher. However, since fly ash contains a high concentration of lead and since the lead is converted into lead hydrochloride under highly alkaline conditions to be soluble in water, the fly ash releases lead when it is discarded without being first processed. In order to prevent fly ash from releasing harmful heavy metals, such as lead, in such incineration systems, the fly ash is mixed with cement, water is added thereto and kneaded, the resulting mix is cured and solidified, and the resulting cake is discarded or is mixed with main ash and is used for land reclamation. However, cement is alkaline. Therefore, if a large amount of such cement is added to fly ash, the release of lead from the fly ash cannot be prevented. Thus, the conventional treatment method of merely solidifying the fly ash with cement involves various problems, and if the use of the method is not limited, the method will cause secondary environmental pollution.

Chelating agents have been used experimentally for the treatment of fly ash. To fly ash which is highly alkaline and which has a high lead content, however, such a chelating agent must be added in an amount of 6% by weight or more of the weight of the fly ash. If not, the amount of the metal to be released from the fly ash cannot be controlled to be within the regulated value or lower. In general, such chelating agents are highly priced, namely their unit prices are from 50 times to 80 times the unit price of cement. Therefore, it is considered that the use of such high-priced chelating agents results in the increase in the operational costs.

Thus, it has become known that the stabilization of heavy metals in fly ash is often difficult by the mere addition of cement or chelating agents thereto. Various companies have produced kneading devices for kneading fly ash and a treating agent therefor, which are used in incineration systems. Such kneading devices have various kneading capacities. Even for kneading devices of the same type, sufficient kneading cannot be attained in some of them if the position through which the kneaded mix is extruded out is not appropriate. In such cases, the effect of the treating agent for stabilizing harmful metals is not constant.

As mentioned above, the current treating agents and the methods of using them have various problems. In addition, there is another problem in that, here in Japan the amount of the land which is reclaimable with waste is small. Given this situations, it is desirable to have a waste-treating agent, by which harmful heavy metals in waste are strongly stabilized so that the thus-stabilized metals are not released, even when a small amount of such a waste-treating agent is added to the waste, and also to provide a method for effectively treating waste.

The object of the present invention is to provide such a waste-treating agent effective for stabilizing waste containing harmful heavy metals, etc. and also a method for treating waste with the agent. In particular, the object of the present invention is to provide a waste-treating agent, by which harmful heavy metals contained in alkaline fly ash to be discharged from garbage incineration systems, such as those mentioned above, are stabilized in such a way that the thus-stabilized metals are not released out, and also to provide a method for effectively treating waste with the agent.

SUMMARY OF THE INVENTION

We, the present inventors have assiduously studied so as to solve the above-mentioned problems and, as a result, have found a waste-treating agent by which the object of the present invention can be attained. Specifically, the treating agent of the present invention is a waste-treating agent consisting, as the essential constitutive component, at least one or more solid acids. In addition, we, the present inventors have further found that the treating agent preferably contains, as the said solid acid component, at least one of aluminium silicates and silicon dioxide having a high specific surface area.

The solid acids to be employed in the present invention will be described in more detail herein under. Various kinds of solid acids can be employed in the present invention. First mentioned are natural clay minerals, such as acid clay, Fuller's earth, montmorillonite, bentonite, kaolin, clarite, FLORIDINE (nature clay by Floridine company), etc., that have been processed to have a specific surface area of from 150 $m^2/g$ to 500 $m^2/g$.

When dried, the acid clay forms porous granules having a large internal surface area. When treated with sulfuric acid, the acid clay partly releases acid-soluble components such as aluminium, etc. As a result, the specific surface area and the pore volume of the thus-treated acid clay are increased. The thus-treated acid clay is referred to as activated clay. As the derivative from the acid clay to be obtained by further treating it with sulfuric acid thereby removing alumina therefrom, known is silicon dioxide. As solid acids which are similar to the acid clay, known are Fuller's earth and Florida earth.

It is preferred that the above-mentioned acid clay and other clay minerals which are used in the present invention are processed so as to have an enlarged specific surface area.

As the solid acids for use in the present invention, also mentioned are solidified acids that are produced by adhering sulfuric acid, phosphoric acid, malonic acid or the like to silica gel or alumina or by adhering phosphoric acid under heat to diatomaceous earth, silica gel, quartz sand or titanium oxide. The important properties of these silica gel, aluminium and others, which are carriers, include high porosity, a large surface area, a large bulk density and high mechanical strength. It cannot be said unconditionally which one or more of these properties have a close relation to the property which stabilizes harmful metals, as depending on the harmful metals to be stabilized with the agent and on the physical properties of the waste to be treated therewith. In general, however, those having a larger surface area are better. Therefore, those having a specific surface area of 150 $m^2/g$ or more are preferred. In order to make the carrier carry the acid under heat, the heating may be conducted at 200° C. to 1000° C.

As the solid acids for use in the present invention, further mentioned are polyanionic compounds and cation-exchange resins. Polyanionic compounds have plural anionic functional groups in one molecule. Such polyanionic compounds are preferably employed in the present invention, as they can remove large amounts of heavy metals from waste. The polyanionic compounds may have the same or different anionic functional groups in one molecule. As specific examples of such polyanionic compounds, mentioned are polyacrylic acid, polyvinylsulfonic acid, polystyrene sulfonic acid, polystyrenephosphoric acid, polyphosphoric acid, etc. Cation-exchange resins have anionic functional groups fixed on a water-insoluble porous carrier. As the carrier, mentioned are inorganic substances such as glass, silica, alumina, etc., as well as polymers of styrene, alkylbenzenesulfonic acids, etc. Anionic functional groups are bonded to these carriers. As the anionic groups, mentioned are mono anions such as thiol group, sulfonato group, sulfato group, carboxyl group, etc., and poly anions.

As the solid acids for use in the present invention, still further mentioned are ZnO, $Al_2O_3$ and their heat-treated products, $TiO_2$ and its heat-treated product, $CeO_2$ and its heat-treated -product, $As_2O_3$, $V_2O_5$, $SiO_2$ and their heat-treated products, and $Sb_2O_5$. These oxides are preferred, since their structures are stable and large amounts of their products having desired properties can be obtained by processing natural substances.

As still other examples of the solid acids for use in the present invention, mentioned are the following:

$CoSO_4$, $MnSO_4$ and their heat-treated products;

$NiSO_4$ and its heat-treated product;

$CuSO_4$ and its heat-treated product;

$CoSO_4$, $CdSO_4$ and their heat-treated products;

$SrSO_4$, $ZnSO_4$ and their heat-treated products;

$MgSO_4$, $FeSO_4$ and their heat-treated products;

Heat-treated $BaSO_4$, $KHSO_4$, $K_2SO_4$, $(NH_4)_2SO_4$, $Al_2(SO_4)_3$, $Fe_2(SO_4)_3$, $Cr_2(SO_4)_3$, $Ca(NO_3)_2 \cdot 4H_2O$, $Bi(NO_3)_3 \cdot 5H_2O$, $Zn(NO_3)_2 \cdot 6H_2O$, $Fe(NO_3)_2 \cdot 9H_2O$, $CaCO_3$, Zr phosphate, Ti phosphate, and aluminium phosphates such as $Al(H_2PO_4)_3$, $Al_2(HPO_4)_3$, $AlPO_4$, etc.;

$PbCl_2$, $HgCl_2$ and their heat-treated products;

$CuCl_2$ and its heat-treated product;

$AlCl_3$ and its heat-treated product;

$SnCl_2$ and its heat-treated product;

$CaCl_2$, $AgCl_2$, $H_2WO_4$, $AgClO_4$, $Mg(ClO_4)_2$, ZnS and their heat-treated products;

CaS;

Aluminium silicates; etc.

Where the solid acids to be used in the present invention are selected from those above-mentioned, those which are as low-priced as possible are preferred in view of the subject matter of the present invention. In addition, the following points shall be taken into consideration.

(1) In compounds containing any of Pb, As, Hg, Cd, etc., these metals themselves correspond to harmful metals which shall be controlled with respect to their amounts to be released from the compounds. Therefore, before their use, these compounds shall be subjected to a released metal content test, by which their safety shall be confirmed.

(2) The optimum solid acids differ, depending on the waste to be treated with them. Therefore, before their use, the solid acids shall be tested by a released metal content test, by which their effect shall be confirmed.

In view of these, preferred embodiments of the solid acids for use in the present invention are aluminium sulfate, aluminium silicates, silicon dioxide, etc.

Regarding the shape of the above-mentioned solid acids for use in the present invention, the acids are preferably in the forms of powders in view of their reactivity. The combined use of a plurality of the solid acids, according to the object of the present invention, is within the scope of the invention.

Aluminium silicates which are used in the present invention are described in detail herein under.

Aluminium silicates are those to be derived from silicon dioxide by substituting a part of the silicon in the dioxide with aluminium, including, for example, natural aluminium silicates such as pumice, fly ash, kaolin, talc, bentonite, activated clay, diatomaceous earth, zeolite, etc., and synthetic aluminium silicates.

The aluminium silicates for use in the present invention are powders. Where a solid substance is made into a powder, the resulting powder is to have physicochemically particular properties. The reasons for this are considered to be mostly as a result of the effect of the surfaces of the particles constituting the powder. In order to examine the surface properties of the powder, it is recommended that the sum of the surface areas of all the particles to be in the unit amount of the powder, that is, the specific surface area of the powder be determined, rather than that the size of each particle in the powder or the distribution of the particles in the same is determined. To determine such a specific surface area of a powder, there are known vapor adsorption methods (BET method, Harkins-Jura's relative method), liquid-phase adsorption methods, heat immersion methods (Harkins-Jura's absolute method) and permeation methods (Blaine method), such as those described in the literature (Illustration of Physical Properties of Powdery Substances, edited by the Powder Engineering Society of the Nippon Powder Industrial Association, 1975). These methods depend on the different principles of measurement and the results to be obtained by them are not always the same. The specific surface area as referred to herein indicates a value obtained by a BET surface area method. Table 1 below shows reported values of specific surface areas of various powders.

TABLE 1

| Name of Powder | Specific Surface Area ($m^2$/g) | Method for Measurement |
|---|---|---|
| Activated Clay | 200–300 | BET Method ($N_2$) |
| Kaolin Clay | 15–30 | BET Method ($N_2$) |
| Flux-calcined Diatomaceous Earth | 1–3 | BET Method ($N_2$) |
| Diatomaceous Earth | 12–40 | BET Method ($N_2$) |
| Fly Ash | 0.25–0.36 | Blaine Method |
| Agalmatolite | 9.6 | BET Method ($N_2$) |
| Portland Cement | 0.28–0.55 | Blaine Method |

(Reprinted from Illustration of Physical Properties of Powdery Substances edited by the Powder Engineering Society of the Nippon Powder Industriai Association, 1975)

It is desirable that the aluminium silicates for use in the present invention have a large specific surface area. This is because the capacity of the waste-treating agent of the present invention for stabilizing harmful metals increases with the increase in the specific surface area of the aluminium silicate to be contained in the agent. However, aluminium silicates having a too large specific surface area are unfavorable. This is because, if the aluminium silicate in the waste-treating agent has a too large specific surface area, the bulk density of the agent is lowered so that the handling of the agent in mixing it with waste becomes difficult, although the agent may stabilize harmful metals without releasing them. For these reasons, it is desirable that the aluminium silicates for use in the present invention have a specific surface area of from 150 $m^2$/g to less than 1000 $m^2$/g, more preferably from 200 $m^2$/g to less than 700 $m^2$/g.

The aluminium atoms in aluminium silicates are four-coordinate and six-coordinate ones. It is desirable that the aluminium atoms in the aluminium silicates for use in the present invention are four-coordinate ones. Aluminium silicates having four-coordinate aluminium atoms shall carry other cations in the lattices, since the three-valent cation of aluminium atom in these compounds cannot maintain by itself the electrically neutral property of the compounds. Therefore, the amounts of heavy metals to be stabilized by such aluminium silicates having four-coordinate aluminium atoms are large. As opposed to these, aluminium silicates having six-coordinate aluminium atoms cannot additionally take other cations there into since the six-coordinate aluminium atom is electrically neutral. Therefore, it is preferred that the aluminium silicates for use in the present invention have four-coordinate aluminium atoms in an amount of 50% or more, more preferably 70% or more, of total aluminium atoms therein. To measure the coordination number of aluminium atoms, NMR is preferably employed. For instance, when $^{27}$Al-NMR for an aluminium silicate sample is measured, using $AlCl_3.6H_2O$ as the reference substance, the peak of the chemical shift of six-coordinate aluminium atom appears in the vicinity of 0 ppm, while that of four-coordinate aluminium atom in the vicinity of 55 ppm. From the proportions of these peak areas appearing in these positions, the ratio of the six-coordinate aluminium atoms to the four-coordinate aluminium atoms, all existing in the aluminium silicate sample measured, can be known.

Various crystalline, amorphous, non-crystalline and vitreous aluminium silicates are known. Of these, any and every powdery aluminium silicate can be used in the present invention. Dried or calcined aluminium silicates can also be used in the present invention. However, for molecular sieving, zeolite cannot be used instead of the aluminium silicate in the present invention. Almost all of the specific surface areas of such zeolite are distributed in fine pores having a pore diameter of 1 nm or less so that only molecules smaller than these fine pores limitatively adsorb to the zeolite. However, since solvent molecules adsorb to such fine pores of the zeolite in a solution, while a minor amount of water thereto even in air, strongly and densely without leaving any void space between the molecules adsorbed. Therefore, heavy metal ions such as lead ions, etc., that have been released from waste, cannot adsorb to the zeolite with the result that, even though it has a large specific surface area, the zeolite does not have a sufficient capacity for stabilizing heavy metals. In addition, different heavy metal ions have significantly different ionic radii, depending on the kind of the ions, and they are coordinated with many impurity ions existing in waste to form complex ions having enlarged ionic radii. Therefore, aluminium silicates having a narrow pore size distribution, such as zeolite, are not preferred for use in the present invention while those having a broad pore size distribution or having pores with broadly varying surface areas are desirably used in the present invention. The aluminium silicates for use in the present invention are not so-called pozzolan substances such as fly ash shown in Table 1 above and incineration furnace ash, and these do not include activated clay having a small specific surface area, kaolin clay, diatomaceous earth, agalmatolite, etc. When the waste-treating agent of the present invention is previously prepared and stored before use, it is preferred that the agent is anhydrous or that it is substantially free from water in order that the deterioration of the cement and of the other additives therein due to absorption of water is not accelerated during storage. Any of the synthetic aluminium silicates and natural aluminium silicates satisfying these requirements can be employed in the present invention. As one example of the synthetic aluminium silicates, mentioned is a synthetic aluminium silicate to be obtained by adding a soluble aluminium salt to a solution of sodium silicate. As one example of the natural aluminium silicates, mentioned is a fine powdery aluminium silicate to be obtained by treating acid clay with an acid followed by powdering it. However, these aluminium silicates are not to be limitative when used in the present invention.

Next, silicon dioxide for use in the present invention will be described in detail herein under. It is desirable that silicon dioxide for use in the present invention is a powder having a large specific surface area since it has an excellent effect of stabilizing heavy metals. This is because the capacity of the waste-treating agent of the present invention for stabilizing harmful metals increases with the increase in the specific surface area of the silicon dioxide to be contained in the agent. However, silicon dioxide having a too large specific surface area is unfavorable. This is because, if the silicon dioxide in the waste-treating agent has a too large specific surface area, the bulk density of the agent is lowered so that the handling of the agent in mixing it with waste becomes difficult, although the agent may stabilize harmful metals without releasing them. For these reasons, it is desirable that the silicon dioxide for use in the present invention has a specific surface area of from 150 $m^2$/g to less than 1000 $m^2$/g, more preferably from 200 $m^2$/g to less than 700 $m^2$/g.

Silicon dioxide has various structures composed of tetrahedral-structured $SiO_4$ units. Therefore, the degree of degeneracy Q (Q=1 to 4), which means the number of oxygen atoms in the $SiO_4$ tetrahedron unit that are bonded to the adjacent silicon atom by covalent bond is referred to so as to describe the state of the silicon atom in silicon dioxide. When the silicon atom in a certain silicon dioxide has a Q of 4, all the bonds to the silicon atom therein are strong Si—O—Si bonds so that this atom is difficult to bond to heavy metal ions such as lead ions. As opposed to this, silicon atom having a Q of 1, 2 or 3 has a Si—O bond or Si—O—X bond in which X represents a hydrogen atom or a metal atom such as Na, Ca or the like. In this case, heavy metal ions such as lead ions are bonded to the Si—O bond or are replaced for the X atom and thus are stabilized. Therefore, silicon dioxide in which silicon atoms with Q4 are as few as possible is preferred for use in the present invention. Precisely, it is preferred that silicon dioxide for use in the present invention has silicon atoms with Q4 in an amount of 85% or less, more preferably 80% or less of all of the silicon atoms therein. To determine the amount of silicon atoms with Q4 in silicon dioxide, Nuclear Magnetic Resonance (NMR) is preferably employed. For instance, when $^{29}$Si-NMR for a silicon dioxide sample is measured, using $(CH_3)_3Si(CH_2)_3SO_3Na$ as the reference substance, the peak of the chemical shift of silicon atom with Q4 appears in the vicinity of –113 ppm, while that of silicon atom with Q3 in the vicinity of –104 ppm and that of silicon atom with Q2 in the vicinity of –95 ppm. From the proportions of these peak areas appearing in these positions, the proportion of the silicon atoms with Q4 existing in the silicon dioxide sample measured can be determined.

Various crystalline, amorphous, non-crystalline and vitreous silicon dioxides are known. Of these, any and every powdery silicon dioxide can be used in the present invention. When the waste-treating agent of the present invention is previously prepared and stored before use, it is preferred that the agent is anhydrous or that it is substantially free from water in order that the deterioration of the cement and of the other additives therein due to absorption of water is not accelerated during storage. Any of synthetic silicon dioxide products and natural silicon dioxide substances satisfying these requirements can be employed in the present invention. The synthetic silicon dioxide products can be produced from sodium silicate and acids. Depending on the reaction conditions such as the reaction temperatures and the concentrations of the starting materials used and also on the other conditions for drying and powdering the products formed, various silicon dioxide products having various physical properties are produced. As examples of the natural silicon dioxide substances, mentioned are fine powdery silicon dioxides to be obtained by treating acid clay or activated clay with an acid followed by powdering it. However, these silicon dioxides are not to be limitative when used in the present invention.

The surface potential of the above-mentioned aluminium silicates and silicon dioxides for use in the present invention has a great influence on the amounts of ions to be adsorbed onto these powdery substances. It is preferable that the aluminium silicates and the silicon dioxides for use in the present invention have a negative surface potential. These powdery substances having a negative surface potential have many negatively-charged adsorption sites on the surfaces of the particles, to which harmful metal cations are adsorbed and stabilized thereon. Therefore, it is desirable that the surface potential of the aluminium silicates and the silicon dioxides for use in the present invention is –15 mV or lower within a pH range of 7 or more. To measure the surface potential of these powdery substances, known are a streaming potential method and an electrophoresis method. Since the powdery aluminium silicates and silicon dioxides for use in the present invention are difficult to suspend in aqueous solutions, as they have large particle sizes, it is recommended their surface potentials be measured by a streaming potential method. In the present invention, a 5% KCl solution, to which NaOH or HCl had been added thereby adjusting its pH to between 2 and 12, was used as the solution for the measurement of the surface potentials of the powdery substances.

The waste-treating agent of the present invention may contain, in addition to the above-mentioned solid acid(s), cement as the essential constitutive component. The cement for use in the present invention includes, for example, hydraulic cement such as portland cement (normal portland cement, ultra-high-early-strength portland cement, moderate heat portland cement, sulfate-resistant portland cement, etc.), mixed cement (fly ash, slag cement, silica, etc.), etc., and air-setting cement such as lime, gypsum, etc. In addition, lime-mixed cement can also be used. Two or more of these can be mixed for use in the present invention. The cement for use in the present invention is not specifically limited, and any appropriate cement that shall be selected in accordance with the properties of the waste to be treated with the treating agent of the present invention and the conditions for treating them can be employed in the present invention.

The waste-treating agent of the present invention may further contain, in addition to the above-mentioned essential constitutive components of solid acids and cement, auxiliary components such as reducing agents, allophane, bentonite, etc. In addition, this may also contain a water-proofing agent (calcium chloride, polymer emulsions, water-soluble polymers, higher fatty acids, etc.), a coagulation accelerator, a solidification accelerator, etc. As the reducing agents, usable are sodium thiosulfate, thiourea, ferrous chloride, ferrous sulfate, sodium sulfite, hydrosulfite, etc. Of these, more preferred are sodium thiosulfate and thiourea. Where the above-mentioned auxiliary components are added to the waste-treating agent of the present invention, it is considered that the treating agent can be, after having been mixed with waste containing harmful heavy metals, kept in a reductive condition due to the reducing agent contained therein, before the cement in the agent is solidified. It is considered that allophane and bentonite will promote the formation of ettringite in cement in the waste-treating agent. In addition, allophane and bentonite will have an physically adsorbing effect. Further, zeolite and active charcoal may be added to the waste-treating agent of the present invention so as to augment the effect of the agent. Therefore, when the compounds selected from the above-mentioned groups are added to the waste-treating agent of the present invention comprising cement and solid acid(s) as the essential constitutive components or to aluminium silicates or silicon dioxides having a large specific area, as auxiliary components, it is expected that the resulting mixtures can stabilize heavy metals more effectively.

The mixing ratio of cement to solid acid(s) in preparing the waste-treating agent of the present invention will be described herein under. The mixing ratio of cement to solid acid(s) may be suitably determined. In general, the content of solid acid(s) in the waste-treating agent is from 10 to 80% by weight, preferably from 20 to 60% by weight. If the content is less than the range, the stabilization of harmful metals by the waste-treating agent is not satisfactory. The larger the content of solid acid(s), the more the harmful heavy metals stabilized, while the thus-stabilized metals are not released. However, to satisfactorily stabilize harmful heavy metals, the content of solid acid(s) within the above-mentioned range is sufficient. If the content of solid acid(s) is larger than the defined range, this excess of solid acid(s) rather retards the solidification of cement in the waste-treating agent so that much time is needed for the solidification of the agent. In addition, the excess of solid acid(s) will unfavorably limit the addition of other components to the waste-treating agent. Moreover, since solid acids having a large specific area are apt to be bulky, the mixing of an excessive amount of solid acid(s) and cement will be difficult and insufficient so that it becomes impossible to produce a large amount of a uniform waste-treating agent. For these reasons, the addition of an excessive amount of solid acid(s) to the waste-treating agent of the present invention is unfavorable.

The mixing ratio of cement to aluminium silicate and silicon dioxide in preparing the waste-treating agent of the present invention may be suitably determined. In general, the content of aluminium silicate and silicon dioxide in the waste-treating agent is from 10 to 80% by weight, preferably from 20 to 60% by weight. As mentioned hereinabove, however, since the effect of aluminium silicate and silicon dioxide having a high specific surface area for stabilizing heavy metals includes not only their intrinsic effect as solid acids but also their effect of making heavy metal ions adsorbed thereto. Therefore, the effect of aluminium silicate and silicon dioxide of stabilizing heavy metals varies, depending on the surface area of the aluminium silicate and silicon dioxide relative to the unit amount of the waste-treating agents containing them. Accordingly, it is recommended that the amounts of aluminium silicate and silicon dioxide to be added to cement are determined on the basis of the surface area of the aluminium silicate and silicon dioxide per the unit amount of the waste-treating agent containing them. Precisely, it is preferred that the surface area of the aluminium silicate and silicon dioxide to be contained in 1 g of the waste-treating agent of the present invention is 50 $m^2/g$ or more, more preferably 100 $m^2/g$ or more.

Next, methods for preparing the waste-treating agent of the present invention will be described herein under. To prepare the waste-treating agent, for example, cement, aluminium silicate, silicon dioxide, solid acid(s), etc. may be mixed anytime before use or may be mixed just before use. If desired, cement, solid acid(s) and other components are added to the waste to be treated therewith all at a time, and these are mixed so as to treat the waste along with them. In the former method of previously mixing the components of the waste-treating agent, the means of how to mix them and the order of their addition are not specifically defined. Where the waste-treating agent prepared by previously mixing the constitutive components is stored, it is recommended that the agent contain water as little as possible, as in ordinary cement. If the waste-treating agent is stored in a closed condition, it is stable like ordinary cement. Aluminium silicate and silicon dioxide can be employed singly or in a combination of the two. In addition, aluminium silicate and/or silicon dioxide can be mixed with cement and other solid acid(s). Needless-to-say, a combination of aluminium silicate and silicon dioxide can be mixed with cement, etc. The waste-treating agent of the present invention, if containing cement, can be solidified to a cake having an elevated mechanical strength. The thus-shaped object can be re-used. The agent containing cement additionally exhibits the intrinsic heavy metal-stabilizing ability of cement. In addition, since cement is alkaline, the waste-treating agent containing cement and solid acid(s) can control the pH value of the waste treated with the agent.

Next, methods of treating waste with the treating agent of the present invention will be described herein under. To treat waste with the waste-treating agent of the present invention, the agent is added to the waste, then water is optionally added thereto, and these are kneaded, cured and solidified. As one preferred embodiment of the present invention, waste such as dust or fly ash are collected in a hopper, to which added is the waste-treating agent of the present invention which is in a separate hopper. These are mixed optionally along with water added thereto, then sufficiently kneaded and extruded out into a shaping device. According to the conventional method for treating waste only with cement, in general, from 10 to 30 parts by weight of cement are added to 100 parts by weight of trash or waste and these are kneaded. According to the method of using the waste-treating agent of the present invention, however, much better results can be obtained if the agent contains the same amount of cement as that in the conventional method. Therefore, if one desires to attain the same heavy metal-stabilizing effect by using the waste-treating agent of the present invention as that attainable by the use of cement only, the amount of the agent of the present invention to be added to the waste may be smaller than that of the cement only to be added thereto. Thus, using the waste-treating agent of the present invention, the volume of the solidified matters to be formed after treatment of the waste with the agent can be reduced. To heavy metals which are insufficiently stabilized by the conventional method of using cement only, the same amount of the waste-treating agent of the present invention as that of cement to be used in the conventional method shall be added, by which such heavy metals are sufficiently stabilized.

As already mentioned hereinabove, it is generally known that Pb in fly ash resulting from incineration of waste is often released out therefrom under alkaline conditions. Slaked lime is introduced along with air into incineration furnaces in order to reduce the amount of hydrogen chloride gas to be generated during incineration of garbage collected in urban areas. Therefore, fly ash collected in electric dust collectors and fly ash collected in bag filters under such operational conditions release an especially large amount of Pb. Since the waste-treating agent of the present invention contains solid acid(s), such alkaline waste may be made nearly neutral by adding the agent thereto, due to the effect of the solid acid(s) in the agent. The waste-treating agent of the present invention has been developed on the basis of this technical concept. However, the addition of the agent of the present invention to alkaline waste does not always result in the lowering of the pH value of the waste, although the expected effect of the agent for inhibiting the release of Pb from the waste to which the agent was added has been confirmed. Therefore, the effect and the mechanism of the solid acid(s) in the waste-treating agent of the present invention are not completely clear at present.

The mechanism of aluminium silicate and silicon dioxide having a large specific surface area, which are used in the present invention, for stabilizing harmful heavy metals may be presumed to essentially comprise an effect of chemically and physically adsorbing harmful metal ions and an effect of coagulating colloidal particles containing harmful metals followed by adsorbing the thus-coagulated particles. Aluminium silicate and silicon dioxide having a large specific surface area act also as solid acids.

Where industrial waste containing harmful heavy metals as well as EP ash and bag ash (especially, EP ash and bag ash into which slaked lime or quick lime has been introduced along with air) to be discharged from incineration furnaces where garbage collected in urban areas are incinerated are treated with the waste-treating agent of the present invention, harmful heavy metals, especially Pb, are efficiently stabilized, while the amount of the these metals that are released from the treated waste is reduced. Thus, the waste-treating agent of the present invention is extremely effective for stabilizing harmful heavy metals in waste. In addition to Pb, other harmful heavy metals such as cadmium, mercury, chromium, copper, nickel, zinc, etc. can be stabilized by the treating agent of the present invention. Further, the waste-treating agent of the present invention can be used for stabilizing slurry sludge and dewatered cake sludge that are discharged from semiconductor plants or metal-plating plants after treatment of various waste liquids from such plants, harmful dust collected from electric smelting furnaces and other apparatuses at steel manufacturing plants so as to protect the working environment of these plants, Ely ash from incineration furnaces for incinerating city garbage, and harmful heavy metals to be contained in soil contaminated due to the disposal of waste for land reclamation, and the thus-stabilized harmful heavy metals are prevented from being released.

DETAILED DESCRIPTION OF EXAMPLES

Next, the present invention will be described in more detail with reference to the following examples, which, however, are not intended to restrict the scope of the present invention. Prior to referring to the examples, the physical properties of various aluminium silicates and silicon dioxides used in the following examples and comparative examples are shown in Tables 2 and 3 below.

TABLE 2

Physical Properties of Various Aluminium Silicate

| Aluminium Silicate | Specific Surface Area [$m^2/g$] | $Al_2O_3$ Content [%] | $SiO_2$ Content [%] | Four-Coordinate Al Atom [%] | pH of Liquid |
|---|---|---|---|---|---|
| Aluminium Silicate (1) | 500 | 10.9 | 64.1 | 79.8 | 6.8 |
| Aluminium Silicate (2) | 250 | 10.5 | 64.5 | 84.0 | 6.8 |
| Aluminium Silicate (3) | 600 | — | — | 77.6 | — |
| Aluminium Silicate (4) | 280 | 11.2 | 68.0 | 79.0 | 7.5 |
| Aluminium Silicate (5) | 250 | 10.3 | 61.4 | — | 6.6 |
| Aluminium Silicate (6) | 250 | 10.6 | 62.3 | — | 6.7 |
| Aluminium Silicate (7) | 100 | 9.5 | 82.0 | — | 10.4 |
| Aluminium Silicate (8) | 110 | 26.0 | 66.0 | — | 7.0 |
| Aluminium Silicate (9) | 250 | 9.8 | 79.2 | 37.0 | — |

TABLE 3

Physical Properties of Various Silicon Dioxides

| Silicon Dioxide | Specific Surface Area ($m^2/g$) | $SiO_2$ Content (%) | Q4 (%) | Mean Particle Size ($\mu m$) | pH of Liquid |
|---|---|---|---|---|---|
| Silicon Dioxide (1) | 429 | 93.7 | 75.2 | 5.1 | 7.4 |
| Silicon Dioxide (2) | 165 | 94.9 | — | 5.5 | 0.5 |
| Silicon Dioxide (3) | 193 | 95.2 | — | 0.8 | 5.8 |
| Silicon Dioxide (4) | 240 | 93.85 | 74.1 | 5.3 | 5.0 |
| Silicon Dioxide (5) | 120 | 93.05 | 86.7 | 5.0 | 5.0 |
| Silicon Dioxide (6) | 109 | 90.9 | — | 7.5 | 10.6 |

The surface potentials of the above-mentioned aluminium silicate (1), aluminium silicate (9) and silicon dioxide (1) at varying pH values are shown in Table 4, Table 5 and Table 6 below, respectively.

TABLE 4

Surface Potentials of Aluminium Silicate (1)

| pH | 2.4 | 3.2 | 4.7 | 6.4 | 7.0 | 9.2 | 9.8 | 10.7 | 11.5 | 12.4 |
|---|---|---|---|---|---|---|---|---|---|---|
| Surface Potential (mV) | −6 | −10 | −13 | −14 | −14 | −16 | −16 | −18 | −18 | −21 |

TABLE 5

Surface Potentials of Aluminium Silicate (9)

| pH | 2.1 | 3.1 | 4.5 | 5.8 | 6.8 | 7.6 | 8.7 | 9.2 | 10.0 | 11.3 | 12.2 |
|---|---|---|---|---|---|---|---|---|---|---|---|
| Surface Potential (mV) | −5 | −6 | −9 | −9 | −10 | −10 | −9 | −8 | −7.6 | −12 | −14 |

TABLE 6

Surface Potential of Silicone Dioxide (1)

| pH | 2.3 | 3.3 | 4.9 | 6.3 | 7.3 | 8.8 | 9.3 | 9.9 | 10.6 | 11.6 | 12.2 |
|---|---|---|---|---|---|---|---|---|---|---|---|
| Surface Potential (mV) | −9 | −13 | −14 | −20 | −20 | −19 | −20 | −20 | −21 | −22 | −29 |

EXAMPLE 1

70 parts by weight of ordinary portland cement (produced by Ube Cement Co.) were mixed with 30 parts by weight of activated clay (produced by Mizusawa Chemical Industry Co.) having a specific surface area of 150 m$^2$/g, 180 m$^2$/g, 190 m$^2$/g, 220 m$^2$/g or 250 m$^2$/g measured by a BET method, to prepare a waste-treating agent of the present invention. As a comparative agent, used was ordinary portland cement. The compositions of the treating agents thus prepared are shown in Table 7 below.

TABLE 7

Compositions of Treating Agents

| Type | Cement (parts by weight) | Activated Clay (parts by weight) | Specific Surface Area of Activated Clay (m$^2$/g) |
|---|---|---|---|
| Treating Agent 1-1 | 70 | 30 | 150 |
| Treating Agent 1-2 | 70 | 30 | 180 |
| Treating Agent 1-3 | 70 | 30 | 190 |
| Treating Agent 1-4 | 70 | 30 | 226 |
| Treating Agent 1-5 | 70 | 30 | 250 |
| Comparative Agent 1-1 | 100 | — | — |

50 g of fly ash containing a large amount of lead, that had been discharged from a city garbage incineration system, were kneaded with 100 g of any one of the above-mentioned treating agents and 30 g of water and then cured for 7 days to be solidified. Afterwards, the thus-formed cakes were tested by a lead release test stipulated in Notification No. 13 of the Environment Agency of Japan (the same shall apply herein under), on the basis of which the effect of each of these treating agents for making the waste harmless was determined. The test results obtained are shown in Table 8 below, which additionally contains the amount of lead released from the fly ash to which only ordinary portland cement (comparative treating agent) was added as the treating agent (comparative example 1-1), the amount of lead released from the non-treated fly ash (comparative example 1-2) and the amount of lead as regulated in Japan.

TABLE 8

Result of Test for Release of Lead

| | Treating Agent Used | Amount of Lead Released (mg/liter) |
|---|---|---|
| Example 1-1 | Treating Agent 1-1 | 0.88 |
| Example 1-2 | Treating Agent 1-2 | 0.59 |
| Example 1-3 | Treating Agent 1-3 | 0.56 |
| Example 1-4 | Treating Agent 1-4 | 0.45 |
| Example 1-5 | Treating Agent 1-5 | 0.29 |
| Comparative Example 1-1 | Comparative Agent 1-1 | 0.96 |
| Comparative Example 1-2 | Non-treated Control | 25 |
| Regulated Value | — | <3 |

The test results shown in Table 8 above indicate that the waste-treating agents of the present invention, each containing, as a solid acid, activated clay that had been processed to have a specific surface area of 150 m$^2$/g or more, have a better effect for stabilizing heavy metals than the conventional cement.

EXAMPLE 2

80 parts by weight of ordinary portland cement (produced by Ube Cement Co.) were mixed with, as a solid acid, 20 parts by weight of one of aluminium sulfate (produced by Wako Pure Chemicals Co.), aluminium phosphate (produced by Wako Pure Chemicals Co.), alum (produced by Wako Pure Chemicals Co.), aluminium silicate (produced by Wako Pure Chemicals Co.) and tannin (produced by Wako Pure Chemicals Co.) to prepare a waste-treating agent of the present invention. As a comparative agent, used was ordinary portland cement. The compositions of the treating agents thus prepared are shown in Table 9 below.

TABLE 9

Compositions of Treating Agents

| Type | Cement (parts by weight) | Activated Clay (parts by weight) | Solid Acid Used |
|---|---|---|---|
| Treating Agent 2-1 | 80 | 20 | Aluminium Sulfate |
| Treating Agent 2-2 | 80 | 20 | Aluminium Phosphate |
| Treating Agent 2-3 | 80 | 20 | Alum |
| Treating Agent 2-4 | 80 | 20 | Aluminium Silicate |
| Treating Agent 2-5 | 80 | 20 | Tannin |

TABLE 9-continued

Compositions of Treating Agents

| Type | Cement (parts by weight) | Activated Clay (parts by weight) | Solid Acid Used |
|---|---|---|---|
| Comparative Agent 2-1 | 100 | — | — |

2 g of lead chloride were added to 18 ml of pure water and fully stirred, and 45 g of one of the above-mentioned treating agents were added thereto, kneaded and cured for 7 days. Afterwards, the thus-cured cakes were tested by a lead release test stipulated in Notification No. 13 of the Environment Agency, on the basis of which the effect of each of these treating agents for making the waste harmless was determined. The test results obtained are shown in Table 10 below, which additionally contains the amount of lead released from the lead chloride solution to which only ordinary Portland cement was added as the treating agent (comparative example 2-1).

TABLE 10

Results of Test for Release of Lead

| | Treating Agent Used | Amount of Lead Released (mg/liter) |
|---|---|---|
| Example 2-1 | Treating Agent 2-1 | <0.1 |
| Example 2-2 | Treating Agent 2-2 | <0.1 |
| Example 2-3 | Treating Agent 2-3 | <0.1 |
| Example 2-4 | Treating Aqent 2-4 | <0.1 |
| Example 2-5 | Treating Agent 2-5 | <0.1 |
| Comparative Example 2-1 | Comparative Agent 2-1 | 21 |
| Regulated Value | — | <3 |

The test results shown in Table 10 above indicate that the waste-treating agents of the present invention, containing, as a solid acid, any of aluminium sulfate, aluminium phosphate, aluminium silicate, alum and a polyaniline compound, tannin, have a better effect for stabilizing heavy metals than the conventional cement.

EXAMPLE 3

A cation-exchange resin (DOWEX 50W-X-8; cation-exchange resin produced by Dow Chemical Co.) was used as the treating agent (3-1). An anion-exchange resin (DOWEX 1-X-8; anion-exchange resin produced by Dow Chemical Co.) was used as the comparative agent (3-1) for a comparative example.

1400 g of distilled water were added to 140 g of lead-containing alkaline fly ash, that had been discharged from a city garbage incineration system, and shaken well. The supernatant thus separated on the resulting mixture was filtered to obtain an extract. 0.2 g of the above-mentioned treating agent were added to 200 g of the extract and shaken for 1 hour. Then, the supernatant thus separated was filtered and the lead concentration in the resulting filtrate was measured. The results obtained are shown in Table 11 below, which additionally contains the lead concentration in the filtrate that had been obtained in the same manner as above while using comparative agent (3-1) for the comparative example and also the lead concentration in the non-treated extract.

TABLE 11

Results of Treating of Fly Ash with Ion-Exchange Resin

| | Ion-Exchange Resin | Lead Concentration (mg/liter) | pH |
|---|---|---|---|
| Example 3-1 | Cation-Exchange Resin | 83 | 12.5 |
| Comparative Example 3-1 | Anion-Exchange Resin | 110 | 12.5 |
| Comparative Example 3-2 | Non-treated Control | 110 | 12.5 |

It is generally known that lead exists as its anion (plumbite ion) in an alkaline range. However, as is obvious from Table 11 above, the lead concentration in the extract from fly ash that had been treated with the cation-exchange resin was lower than that in the non-treated extract. However, the lead concentration in the extract from fly ash that had been treated with the anion-exchange resin was the same as that in the non-treated extract. From these, it is known that the cation-exchange resin which was used as a solid acid has an excellent effect of stabilizing heavy metals.

EXAMPLE 4

80 parts by weight of ordinary portland cement (produced by Ube Cement Co.) were mixed with 20 parts by weight of potassium sulfate (produced by Wako Pure Chemicals Co.) or calcium carbonate (produced by Wako Pure Chemicals Co.) to prepare a treating agent. 15 g of this treating agent were added to 50 g of a lead-containing, alkaline fly ash discharged from a city garbage incineration system and kneaded along with 30 g of water. The resulting blend was cured for 7 days to be solidified. As a comparative example, 15 g of ordinary portland cement were added to 50 g of the same fly ash as above and kneaded along with 30 g of water, and the resulting blend was cured and solidified in the same manner as above. Afterwards, the thus-formed cakes were tested by a metal release test stipulated in Notification No. 13 of the Environment Agency, on the basis of which the effect of each of these treating agents for making the waste harmless was comparatively determined. The test results obtained are shown in Table 12 below, which additionally lists the amount of lead as regulated in Japan.

TABLE 12

Results of Test for Release of Lead

| | Solid Acid Used | Content of Solid Acid in Treating Agent (%) | Amount of Lead Released (mg/liter) |
|---|---|---|---|
| Example 4-1 | Potassium Sulfate | 20 | 0.13 |
| Example 4-2 | Calcium Carbonate | 20 | 0.12 |
| Comparative 4-1 | Cement | 0 | 3.3 |
| Regulated Value | — | — | 3 |

The results in Table 12 above indicate that the amount of lead released was effectively lowered to below the regulated value when the treating agents of the present invention were used, although such was impossible when only cement was used. These results support the effect of the waste-treating agents of the present invention and the effect of the method of treating waste with these agents.

EXAMPLE 5

60 parts by weight of ordinary portland cement (produced by Ube Cement Co.) were mixed with 40 parts by weight of aluminium oxide (produced by Wako Pure Chemicals Co.) to prepare a treating agent. This treating agent was added to 50 g of a lead-containing, alkaline fly ash discharged from a city garbage incineration system and kneaded along with 30 g of water. The resulting blend was cured for 7 days and was thus solidified. As a comparative example, 5 g or 15 g of ordinary portland cement were added to 50 g of the same fly ash as above and kneaded along with 30 g of water, and the resulting blend was cured and solidified in the same manner as above. Afterwards, the thus-formed cakes were tested by a metal release test stipulated in Notification No. 13 of the Environment Agency, on the basis of which the effect of each of these treating agents for making the waste harmless was comparatively determined. The test results obtained are shown in Table 13 below, which additionally lists the amount of lead released from the non-treated fly ash and the amount of lead as regulated in Japan.

TABLE 13

Results of Test for Release of Lead

| | Amount of Treating Agent Added (g) | Amount of Lead Released (mg/liter) |
|---|---|---|
| Non-treated Control | — | 91 |
| Example 5-1 | 2.5 | 35 |
| Example 5-2 | 5 | 31 |
| Example 5-3 | 10 | 15 |
| Example 5-4 | 15 | <0.1 |
| Comparative Example 5-1 | 5 | 45 |
| Comparative Example 5-2 | 15 | 7.7 |
| Regulated Value | — | 3 |

The results in Table 13 above indicate that the amount of lead released was effectively lowered to below the regulated value when the treating agents of the present invention were used, although such was impossible when only cement was used. These results support the effect of the waste-treating agents of the present invention and the effect of the method of treating waste with these agents.

EXAMPLE 6

Treating agents (6-1) to (6-5) were prepared by mixing the components shown in Table 14 below were prepared.

TABLE 14

Compositions of Treating Agents (wt. %)

| Treating Agent | Cement | Aluminium Sulfate | Aluminium Silicate |
|---|---|---|---|
| Treating Agent 6-1 | 50 | 50 | 0 |
| Treating Agent 6-2 | 80 | 20 | 0 |
| Treating Agent 6-3 | 50 | 0 | 50 |
| Treating Agent 6-4 | 40 | 30 | 30 |
| Treating Agent 6-5 | 30 | 35 | 35 |

To 50 g of each of two kinds of high-alkaline fly ash A (lead content: 0.9% by weight) and high-alkaline fly ash B (lead content: 0.2% by weight), both having been discharged from a city garbage incineration system, added was one of the above-mentioned treating agents (6-1) to (6-5) in the amount as indicated in Table 15 below. These were kneaded along with 25 g of water, and the resulting blends were cured for 7 days and were thus solidified. The thus-formed cakes were tested by a metal release test stipulated in Notification No. 13 of the Environment Agency, and the test results are shown in Table 15. The same process as above was repeated, except that 15 g of ordinary portland cement (produced by Ube Cement Co.) were added to each of the above-mentioned fly ashes A and B. The resulting cakes and non-treated fly ashes A and B were tested in the same manner as above and the test results are shown in Table 15 as comparative examples. The aluminium sulfate and the aluminium silicate used herein are standard chemicals (produced by Wako Pure Chemicals Co.).

TABLE 15

Results of Test for Release of Lead

| | | Treating Agent | | Amount of Lead Released (mg/liter) | pH |
|---|---|---|---|---|---|
| | Type of Fly Ash | Type | Amount Added (g) | | |
| Example 6-1 | A | Treating Agent 6-1 | 15 | 0.1 | 11.2 |
| Example 6-2 | B | Treating Agent 6-2 | 15 | 1.5 | 12.7 |
| Example 6-3 | B | Treating Agent 6-3 | 15 | 0.2 | 12.5 |
| Example 6-4 | B | Treating Agent 6-4 | 15 | 0.1 | 12.4 |
| Example 6-5 | B | Treating Agent 6-5 | 15 | <0.1 | 12.3 |
| Comparative Example 6-1 | A | Cement | 15 | 13 | 12.5 |
| Comparative Example 6-2 | B | Cement | 7.5 | 3.6 | 12.3 |
| Comparative Example 6-3 | B | Cement | 15 | 1.7 | 12.8 |
| Comparative Example 6-4 | A | — | — | — | 12.7 |
| Comparative Example 6-5 | B | — | — | — | 13.0 |

Comparing the test results in Examples (6-1) to (6-5) with those in Comparative Examples (6-1) to (6-5), it is known that the release of lead was more effectively inhibited by the use of the treating agents of the present invention while the amount of lead released was somewhat lowered even by the treatment with only cement. These results support the effect of the waste-treating agents of the present invention and the effect of the method of treating waste with these agents.

EXAMPLE 7

60 parts by weight of ordinary portland cement (produced by Ube Cement Co.) were mixed with 10 parts by weight of aluminium silicate (produced by Wako Pure Chemicals Co.) to prepare a treating agent (7-1). A treating agent (7-2) was prepared in the same manner as above, except that the aluminium silicate was replaced by synthetic silicon dioxide (produced by Shionogi & Co.). To 50 g of each of fly ash A and fly ash C, both having been discharged from a city garbage incineration system, and fly ash B that had been discharged from an industrial waste incineration system, added was each of these treating agents. These were kneaded along with 30 g of water, and the resulting blends were cured for 7 days and were thus solidified. As comparative examples, ordinary portland cement was added to 50 g of each of the above-mentioned fly ashes, and these were kneaded along with 30 g of water, then cured and solidified in the same manner as above. Afterwards, the thus-formed cakes were tested by a metal release test stipulated in Notification No. 13 of the Environment Agency, on the basis of which the effect of each of these treating agents for making the waste harmless was comparatively determined. The test results obtained are shown in Table 16 below, which additionally lists the amount of metal released from each of the non-treated fly ashes.

TABLE 16

| Type of Fly Ash | Treating Agent Type | Amount Added (%) | Amount of Water Added (g) | Amount of Metal Released (mg/liter) | | |
|---|---|---|---|---|---|---|
| | | | | Pb | Zn | Cd |
| Example 7-1 | 7-A | Treating Agent 7-1 | 10 | 42 | 0.85 | <0.1 | — |
| Example 7-2 | | | 20 | 42 | 0.46 | <0.1 | — |
| Example 7-3 | | Treating Agent 7-2 | 10 | 42 | 0.76 | <0.1 | — |
| Example 7-4 | | | 20 | 46 | 0.31 | <0.1 | — |
| Comparative Example 7-1 | | Cement | 20 | 42 | 1.2 | <0.1 | — |
| Comparative Example 7-2 | | Kneaded only with water | | 42 | 9.1 | 0.79 | — |
| Example 7-5 | 7-B | Treating Agent 7-1 | 10 | 21 | ND | 0.19 | <0.001 |
| Example 7-6 | | | 20 | 24 | ND | <0.1 | <0.001 |
| Example 7-7 | | Treating Agent 7-2 | 10 | 24 | ND | 0.13 | <0.001 |
| Example 7-8 | | | 20 | 27 | ND | <0.1 | <0.001 |
| Comparative Example 7-3 | | Cement | 20 | 21 | ND | 0.97 | <0.08 |
| Comparative Example 7-4 | | Kneaded only with Water | | 21 | 0.62 | 1.6 | 0.1 |
| Example 7-9 | 7-C | Treating Agent 7-1 | 10 | 30 | 0.18 | <0.1 | — |
| Example 7-10 | | | 20 | 30 | ND | <0.1 | — |
| Example 7-11 | | Treating Agent 7-2 | 10 | 30 | 0.12 | <0.1 | — |
| Example 7-12 | | | 20 | 33 | ND | <0.1 | — |
| Comparative Example 7-5 | | Cement | 20 | 30 | 3.1 | <0.1 | — |
| Comparative Example 7-6 | | Kneaded only with Water | | 30 | 0.35 | <0.1 | — |

From the results in Table 16 above, it is obvious that the combination of cement and a solid acid, aluminium silicate or silicon dioxide, gives highly-efficient waste-treating agents.

EXAMPLE 8

Aluminium silicate (1) (specific surface area: 500 m$^2$/g) shown in Table 2 above was used as the treating agent (8-1). 50 g of fly ash containing a large amount of lead (amount of lead released from the non-treated fly ash: 130 mg/liter), that had been discharged from a city garbage incineration system, were kneaded with 6 g of the treating agent (8-1) and 30 g of water, and the resulting blend was cured for 7 days and was thus solidified. Afterwards, the thus-formed cake was tested by a lead release test stipulated in Notification No. 13 of the Environment Agency, on the basis of which the effect of the treating agent for making the waste harmless was determined. The test results obtained are shown in Table 17 below. Using 6 g of aluminium silicate (7) (specific surface area: 100 m$^2$/g) and 6 g of aluminium silicate (8) (specific surface area: 110 m$^2$/g), both shown in Table 2 above as comparative samples, the same process and the same test as above were repeated as comparative examples (8-1) and (8-2), respectively, and the amount of lead released was measured in both comparative examples. Table 17 below additionally shows the amount of lead released from the non-treated fly ash and the amount of lead as regulated in Japan.

TABLE 17

Results of Test or Release of Lead

| | Treating Agent | | | Amount of Lead Released (mg/liter) |
|---|---|---|---|---|
| | Type | Specific Surface Area (m$^2$/g) | Amount Added (g) | |
| Example 8-1 | Treating Agent 8-1 | 500 | 6 | 0.84 |
| Comparative Example 8-1 | Comparative Treating Agent 8-1 | 100 | 6 | 9.8 |
| Comparative Example 8-2 | Comparative Treating Agent 8-2 | 110 | 6 | 24 |
| Non-treated Control | — | — | — | 130 |
| Regulated Value | — | — | — | <3 |

From the test results shown in Table 17 above, it is known that treating agent (8-1) of the present invention has an excellent effect of passivating and sequestering lead. When aluminium silicate (7) and aluminium silicate (8) having a small specific surface area were used as treating agents, the amount of lead released from the fly ash treated therewith could not be lowered to below the regulated value. As opposed to these, when aluminium silicate (1) having a large specific surface area was used (Example 8-1), the amount of lead released from the fly ash treated therewith was lowered to below the regulated value.

EXAMPLE 9

Aluminium silicate (1) (content of four-coordinate aluminium atoms: 79.8%) shown in Table 2 above was used as the treating agent (9-1). 50 g of fly ash containing a large amount of lead (lead content: 2000 mg/dry weight, CaO content: 41.4%), that had been discharged from a city garbage incineration system, were kneaded with a predetermined amount (1 g, 2 g, 4 g, 6 g, 8 g) of the treating agent (9-1) and 30 g of water, and the resulting blends were cured for 7 days and were thus solidified. Afterwards, the thus-formed cakes were tested by a lead release test stipulated in Notification No. 13 of the Environment Agency, on the basis of which the effect of treating agent for making the waste harmless was determined. The test results obtained are shown in Table below. As comparative examples, each of ordinary cement (Comparative Example 9-1) and fly ash cement comparative Example 9-2) was added, as a treating agent, 10 g of the same fly ash as above, and the amount of d released from the thus-treated fly ash was measured both cases in the same manner as above. The test results are shown in Table 18 below, which additionally s the amount of lead released from the non-treated fly and the amount of lead as regulated in Japan.

TABLE 18

Results of Test for Release of Lead

| | Treating Agent | | | |
|---|---|---|---|---|
| | Type | Content of Four-coordinate Al Atoms (%) | Amount Added (%) | Amount of Lead Released (mg/liter) |
| Example 9-1 | Treating | 79.8 | 1 | 30 |
| Example 9-2 | Agent 9-1 | | 2 | 15 |
| Example 9-3 | (aluminum | | 4 | 3.7 |
| Example 9-4 | silicate (1) | | 6 | 0.75 |
| Example 9-5 | | | 8 | <0.1 |
| Comparative Example 9-1 | Ordinary Cement | — | 10 | 5.8 |
| Comparative Example 9-2 | Fly Ash Cement | — | 10 | 4.7 |
| Non-treated Control | — | — | — | 91 |
| Regulated Value | — | — | — | <3 |

From the test results shown in Table 18 above, it is known that treating agent (9-1) of the present invention has an excellent effect of passivating and sequestering lead. When ordinary cement and fly ash cement were used as treating agents, the amount of lead released from the fly ash treated therewith could not be lowered to below the regulated value even though 10 g of the treating agent were added to 50 g of fly ash. As opposed to these, when treating agent (9-1) of the present invention was used, the amount of lead released from the fly ash treated therewith was lowered to below 0.1 mg/liter (detectable limit) although the amount of the treating agent added was smaller than that of the comparative agent added.

Aluminium silicate (9) (content of four-coordinate aluminium atoms: 37%) shown in Table 2 above was kneaded with 50 g of the same fly ash as above and 30 g of water, then the resulting blend was cured for 7 days and was thus solidified. Afterwards, the thus-formed cakes were tested by a lead release test stipulated in Notification No. 13 of the Environment Agency, on the basis of which the effect of the treating agent for making the waste harmless was determined. The test results obtained are shown in Table 19 below.

TABLE 19

Results of Test for Release of Lead

| | Treating Agent | | | |
|---|---|---|---|---|
| | Type | Content of Four-coordinate Al Atoms (%) | Amount Added (%) | Amount of Lead Released (mg/liter) |
| Comparative Example 9-3 | Comparative Agent 9-1 | 37.0 | 1 | 70 |

TABLE 19-continued

Results of Test for Release of Lead

| | Treating Agent | | | |
|---|---|---|---|---|
| | Type | Content of Four-coordinate Al Atoms (%) | Amount Added (%) | Amount of Lead Released (mg/liter) |
| Comparative Example 9-4 | (aluminum silicate (9) | | 2 | 48 |
| Comparative Example 9-5 | | | 4 | 30 |
| Comparative Example 9-6 | | | 6 | 14 |
| Comparative Example 9-7 | | | 8 | 3.1 |
| Non-treated Control | — | — | — | 91 |
| Regulated Value | — | — | — | <3 |

Comparing the results in Table 19 and those in Table 18, it is known that the lead-stabilizing ability of comparative agent (9-1) (aluminium silicate (9) having a four-coordinate Al atom content of 37% of all Al atoms) is lower than that of treating agent (9-1) (aluminium silicate (1) having a four-coordinate Al atom content of 79.8% of all Al atoms). Precisely, the amount of lead released from the fly ash treated with comparative agent (9-1) was higher than that of lead released from the fly ash treated with treating agent (9-1) when the amounts of these agents used were the same. When 8 g of treating agent (9-1) were added to 50 g of fly ash, the amount of lead released from the thus-treated fly ash was lowered to below the detectable limit. However, when 8 g of comparative agent (9-1) were added to the same, the amount of lead released from the thus-treated fly ash was not lowered to below the regulated value. From these results, it is known that the aluminium silicate having a larger four-coordinate Al atom content has a larger heavy-metal-stabilizing capacity.

EXAMPLE 10

Aluminium silicates (1), (2), (3) and (4) shown in Table 2 above (all having a four-coordinate Al atom content of more than 50% of all Al atoms) were used as treating agent (10-1), treating agent (10-2), treating agent (10-3) and treating agent (10-4), respectively. 50 g of fly ash containing a large amount of lead (amount of lead released from the non-treated fly ash: 47 mg/liter), that had been discharged from a city garbage incineration system, were kneaded with 5 g of each of treating agents (10-1) to (10-4) and 30 g of water, and the resulting blends were cured for 7 days and were thus solidified. Afterwards, the thus-formed cakes were tested by a lead release test stipulated in Notification No. 13 of the Environment Agency, on the basis of which the effect of the treating agents for making the waste harmless was determined. The test results obtained are shown in Table 20 below. 5 g of aluminium silicate (9) shown in Table 2 above were added, as comparative agent (10-1), to 50 g of the same fly ash as above, and the same process and the same test as above were repeated as a comparative example. The test result obtained is also shown in Table 20.

TABLE 20

Results of Test for Release of Lead

| | Treating Agent | | | |
|---|---|---|---|---|
| | Type | Content of Four-coordinate Al Atoms (%) | Amount Added (%) | Amount of Lead Released (mg/liter) |
| Example 10-1 | Treating Agent 10-1 | 79.8 | 1 | <0.01 |
| Example 10-2 | Treating Agent 10-2 | 84.0 | 5 | <0.01 |
| Example 10-3 | Treating Agent 10-3 | 77.6 | 5 | 0.01 |
| Example 10-4 | Treating Agent 10-4 | 79.0 | 5 | <0.01 |
| Comparative Example 10-1 | Comparative Agent 10-1 | 37.0 | 5 | 0.40 |
| Non-treated Control | — | — | — | 47 |

From the test results shown in Table 20 above, it is known that treating agents (10-1) to (10-4) of the present invention have an excellent effect of passivating and sequestering lead. In this experiment, the precision of the analysis was improved so as to have a detectable limit of 0.01 mg/liter. Even under the severe measurement conditions of this experiment, the lead released from the fly ash treated with any one of treating agents (10-1), (10-2) or (10-4) of this invention was lowered to below the detectable limit and that released from the fly ash treated with treating agent (10-3) of this invention was lowered to 0.01 mg/liter. As opposed to these, however, the amount of lead released from the fly ash treated with comparative agent (10-1) (aluminium silicate (9)) was 0.40 mg/liter, which is not lower than 40 times that of lead released from the fly ash treated with any one of treating agents (10-1) to (10-4) of this invention.

EXAMPLE 11

40 parts by weight of any one of aluminium silicate (1), (2), (5) and (6), all shown in Table 2 above, were added to 60 parts by weight of ordinary cement and sufficiently mixed to prepare treating agents (11-1) to (11-4), respectively, as shown in Table 21 below.

TABLE 21

Compositions of Treating Agents

| | Type of Aluminium Silicate | Specific Surface Area of Aluminium Silicate ($m^2/g$) | Amount of Aluminium Silicate (parts by weight) | Amount of Cement (parts by weight) |
|---|---|---|---|---|
| Treating Agent 11-1 | Aluminium Silicate (1) | 500 | 40 | 60 |
| Treating Agent 11-2 | Aluminium Silicate (2) | 250 | | |
| Treating Agent 11-3 | Aluminium Silicate (5) | 250 | | |
| Treating Agent 11-4 | Aluminium Silicate (6) | 250 | | |

50 g of fly ash containing a large amount of lead, that had been discharged from a city garbage incineration system, were kneaded with a pre-determined amount of any one of treating agents (11-1) to (11-4) and 30 g of water, and the resulting blends were cured for 7 days and were thus solidified. Afterwards, the thus-formed cakes were tested by a lead release test stipulated in Notification No. 13 of the Environment Agency, on the basis of which the effect of the treating agents for making the waste harmless was determined. The test results obtained are shown in Table 22 below. As a comparative example, ordinary cement was used as a treating agent, and the amount of lead released from the thus-treated fly ash was measured and shown in Table 22 below, which additionally lists the amount of lead released from the non-treated fly ash.

TABLE 22

Results of Test for Release of Lead

| | Treating Agent | | | |
|---|---|---|---|---|
| | Type | Surface Area of Aluminium Silicate per Gram of Treating Agent ($m^2$) | Amount Added (g) | Amount of Lead Released (mg/liter) |
| Example 11-1 | Treating Agent 11-1 | 200 | 2.5 | 1.1 |
| Example 11-2 | | | 5.0 | 0.5 |
| Example 11-3 | | | 7.5 | 0.3 |
| Example 11-4 | | | 10.0 | 0.1 |
| Example 11-5 | | | 12.5 | <0.1 |
| Example 11-6 | | | 15.0 | |
| Example 11-7 | Treating Agent 11-2 | 100 | 7.5 | 0.4 |
| Example 11-8 | Treating Agent 11-3 | 100 | 7.5 | 0.5 |
| Example 11-9 | Treating Agent 11-4 | 100 | 7.5 | 0.5 |
| Comparative Example 11-1 | Ordinary Cement | — | 7.5 | 0.9 |
| Non-treated Control | — | — | — | 27 |

From the test results shown in Table 22 above, it is known that treating agents (11-1) to (11-4) of the present invention have an excellent effect of preventing the release of lead from the fly ash treated therewith. Precisely, even when a smaller amount of treating agent (11-1) was added to fly ash (Example 11-2) than the amount of ordinary cement added thereto, the amount of lead released from the fly ash treated therewith was lower than that of lead released from the fly ash treated with ordinary cement (Comparative Example 11-1). When the same amount (7.5 g—Example 11-3) of treating agent (11-1) was added to fly ash, as the amount of ordinary cement added thereto (Comparative Example 11-1), the amount of lead released from the fly ash treated therewith was lower by ⅓ than that of lead released from the fly ash treated with ordinary cement. Regarding the other treating agents, when the same amount of any one of treating agents (11-2) to (11-4) was added to fly ash, as the amount of ordinary cement added thereto, the amount of lead released from the fly ash treated therewith was lower than that of lead released from the fly ash treated with ordinary cement. Comparing treating agents (11-1) to (11-4) with each other, it is known that treating agent (11-1) containing aluminium silicate having a larger specific surface area has a higher effect of preventing the release of lead from the fly ash treated therewith.

EXAMPLE 12

35 parts by weight of aluminium silicate (1) (specific surface area: 500 $m^2/g$) shown in Table 2 above were added to 65 parts by weight of cement shown in Table 23 below and well mixed to prepare treating agent (12-1), treating agent (12-2) and treating agent (12-3), as shown Table 23.

TABLE 23

Compositions of Treating Agents

| | Type of Cement | Specific Surface Area of Aluminium Silicate ($m^2/g$) | Amount of Aluminium Silicate (parts by weight) | Amount of Cement (parts by weight) |
|---|---|---|---|---|
| Treating Agent 12-1 | Ordinary Cement | 500 | 35 | 65 |
| Treating Agent 12-2 | High-early-strength Cement | | | |
| Treating Agent 12-3 | Slag Cement | | | |

50 g of fly ash containing a large amount of lead, that had been discharged from a city garbage incineration system, were kneaded with a pre-determined amount of any one of treating agent (12-1), treating agent (12-2) and treating agent (12-3), along with 30 g of water, and the resulting blends were cured for 7 days and were thus solidified. Afterwards, the thus-formed cakes were tested by a lead release test stipulated in Notification No. 13 of the Environment Agency, on the basis of which the effect of the treating agents for making the waste harmless was determined. The test results obtained are shown in Table 24 below. As a comparative example, ordinary cement only was added to fly ash, as a treating agent, and the amount of lead released from the thus-treated fly ash was measured and shown in Table 24 below, which additionally lists the amount of lead released from the non-treated fly ash and the amount of lead as regulated in Japan.

TABLE 24

Results of Test for Release of Lead

| | Treating Agent | | | |
|---|---|---|---|---|
| | Type | Surface Area of Aluminium Silicate per Gram of Treating Agent ($m^2$) | Amount Added (g) | Amount of Lead Released (mg/liter) |
| Example 12-1 | Treating Agent 12-1 | 175 | 10 | 0.8 |
| Example 12-2 | Treating Agent 12-2 | | | 0.7 |
| Example 12-3 | Treating Agent 12-3 | | | 1.5 |
| Comparative Example 12-1 | Ordinary Cement | — | 10 | 5.8 |
| Non-treated Control | — | — | — | 100 |
| Regulated Value | — | — | — | <3 |

From the test results shown in Table 24 above, it is known that treating agents (12-1), (12-2) and (12-3) of the present invention have an excellent effect of preventing the release of lead from the fly ash treated therewith. Precisely, since these treating agents of the present invention were comprised of aluminium silicate having a high specific surface area and cement, the amount of lead released from the fly ash treated with any one of these was much lower than that of lead released from the fly ash treated with ordinary cement only. The kind of cement to be added to aluminium silicate to form the treating agents of the present invention is not specifically defined. It is known from the results in Table 24 above that the effect of the treating agents of the present invention is higher than that of cement only, irrespective of the kind of cement added to these treating agents.

EXAMPLE 13

Aluminium silicate (1) shown in Table 2 above was added to ordinary cement and well mixed to prepare treating agent (13-1) to treating agent (13-6), as shown in Table 25 below.

TABLE 25

Compositions of Treating Agents

| | Cement (parts by weight) | Aluminium Silicate (parts by weight) |
|---|---|---|
| Treating Agent 13-1 | 60 | 40 |
| Treating Agent 13-2 | 70 | 30 |
| Treating Agent 13-3 | 75 | 25 |
| Treating Agent 13-4 | 80 | 20 |
| Treating Agent 13-5 | 85 | 15 |
| Treating Agent 13-6 | 90 | 10 |

50 g of fly ash containing a large amount of lead, that had been discharged from a city garbage incineration system, were kneaded with a pre-determined amount of any one of treating agents (13-1) to (13-6) and 30 g of water, and the resulting blends were cured for 7 days and were thus solidified. Afterwards, the thus-formed cakes were tested by a lead release test stipulated in Notification No. 13 of the Environment Agency, on the basis of which the effect of the treating agents for making the waste harmless was determined. The test results obtained are shown in Table 26 below. As a comparative example, ordinary cement only was added to fly ash, as a treating agent, and the amount of lead released from the thus-treated fly ash was measured and shown in Table 24 below, which additionally has the amount of lead released from the non-treated fly ash.

TABLE 26

Results of Test for Release of Lead

| | Treating Agent | | | |
|---|---|---|---|---|
| | Type | Surface Area of Aluminium Silicate per Gram of Treating Agent ($m^2$) | Amount Added (g) | Amount of Lead Released (mg/liter) |
| Example 13-1 | Treating Agent 13-1 | 200 | 7.5 | 1.4 |
| Example 13-2 | Treating Agent 13-2 | 150 | 7.5 | 1.2 |
| Example 13-3 | Treating Agent 13-3 | 125 | 7.5 | 1.3 |
| Example 13-4 | Treating Agent 13-4 | 100 | 7.5 | 1.6 |
| Example 13-5 | Treating Agent 13-5 | 75 | 7.5 | 2.4 |
| Example 13-6 | Treating Agent 13-6 | 50 | 7.5 | 5.1 |
| Comparative Example 13-1 | Ordinary Cement | — | 10 | 9.8 |
| Non-treated Control | — | — | — | 110 |

From the results shown in Table 26 above, it is known that the amount of lead released from the fly ash treated with any one of the treating agents of the present invention was smaller than that of lead released from the fly ash treated with ordinary cement only, even though the amount of each of the treating agents of the present invention added to fly ash was smaller than the amount of ordinary cement only added thereto. In other words, it is known that the treating agents of the present invention each containing aluminium silicate having a surface area of 50 $m^2$ or more per gram of the treating agent have a higher lead-stabilizing effect than ordinary cement.

EXAMPLE 14

Silicon dioxide (1) and (2) shown in Table 3 above were used as treating agent (14-1) and treating agent (14-2), respectively. 50 g of fly ash containing a large amount of lead (amount of lead released from the non-treated fly ash: 40 mg/liter), that had been discharged from a city garbage incineration system, were kneaded with 5 g of treating agent (14-1) or treating agent (14-2) along with 30 g of water, and the resulting blends were cured for 9 days and were thus solidified. Afterwards, the thus-formed cakes were tested by a lead release test stipulated in Notification No. 13 of the Environment Agency, on the basis of which the effect of the treating agents for making the waste harmless was determined. The test results obtained are shown in Table 27 below.

TABLE 27

Results of Test for Release of Lead

| | Treating Agent | | | | |
|---|---|---|---|---|---|
| | Type | Specific Surface Area ($m^2$/g) | Q4 Content (%) | Amount Added (g) | Amount of Lead Released (mg/liter) |
| Example 14-1 | Treating Agent 14-1 | 429 | 75.2 | 8 | <0.1 |
| Example 14-2 | Treating Agent 14-2 | 165 | — | 8 | <0.1 |
| Comparative Example 14-1 | Silicon Dioxide (5) | 120 | 86.7 | 8 | 0.25 |
| Non-treated Control | — | — | — | — | 40 |

From the test results shown in Table 27 above, it is known that the treating agents of the present invention have an excellent effect of passivating and sequestering lead. Precisely, when the silicon dioxide having a specific surface area of more than 150 $m^2$/g was used as the treating agent, the amount of lead released from the fly ash treated therewith could be lowered to below the detectable limit. However, when the silicon dioxide having a specific surface area of less than 150 $m^2$/g was used as a comparative example, the amount of lead released from the fly ash treated therewith was 0.25 mg/liter. The treating agent of Example 14-1 was silicon dioxide having a Q4 silicon atom content of less than 85%, while that of Comparative Example 14-1 was silicon dioxide having a Q4 silicon atom content of more than 85%.

EXAMPLE 15

50 parts by weight of ordinary portland cement were well mixed with 50 parts by weight of either of silicon dioxide (1) and silicon dioxide (3) shown in Table 3 above, to prepare treating agent (15-1) and treating agent (15-2), respectively. 100 g of fly ash containing a large amount of lead (lead content: 1300 mg/kg, amount of lead released from the non-treated fly ash: 40 mg/liter), that had been discharged from a city garbage incineration system, were kneaded with 7.5 g or 15 g of either of treating agent (15-1) and treating agent (15-2), along with 30 g of water, and the resulting blends were cured for 7 days and were thus solidified. Afterwards, the thus-formed cakes were tested by a lead release test stipulated in Notification No. 13 of the Environment Agency, on the basis of which the effect of the treating agents for making the waste harmless was determined. The test results obtained are shown in Table 28 below. As comparative examples, 15 g of silicon dioxide (6) shown in Table 3 above and 15 g of ordinary portland cement were used as comparative agent (15-1) and comparative agent (15-2), respectively, and these were tested in the same manner as above. The test results are also shown in Table 28 below.

TABLE 28

Results of Test for Release of Lead

| | Treating Agent | | | | |
|---|---|---|---|---|---|
| | Type | Specific Surface Area of Silicon Dioxide ($m^2$/g) | Surface Area of Silicon Dioxide per Gram of Treating Agent ($m^2$) | Amount Added (g) | Amount of Lead Released (mg/liter) |
| Example 15-1 | Treating Agent 15-1 | 429 | 215 | 15 | <0.1 |
| Example 15-2 | | | | 7.5 | 0.40 |
| Example 15-3 | Treating Agent 15-2 | 237 | 119 | 15 | 0.18 |
| Example 15-4 | | | | 7.5 | 0.46 |
| Comparative Example 15-1 | Comparative Agent 15-1 | 109 | 55 | 15 | 0.46 |
| Comparative Example 15-2 | | | | 7.5 | 0.96 |
| Comparative Example 15-3 | Comparative Agent 15-2 | — | — | 1.5 | 1.3 |
| Non-treated Control | — | — | — | — | 40 |

From the test results shown in Table 28 above, it is known that treating agent (15-1) and treating agent (15-2) of the present invention have an excellent effect of passivating and sequestering lead. Precisely, it is known that when silicon dioxide having a specific surface area of more than 150 $m^2$/g was used as the treating agent, the amount of lead released from the fly ash treated therewith was less than ½ of the amount of lead released from the fly ash treated with silicon dioxide having a specific surface area of less than 150 $m^2$/g and was less than ¹/₁₀ of the amount of lead released from the fly ash treated with portland cement. When 30% by weight of treating agent (15-1) was added to fly ash, it was possible to lower the amount of lead released from the fly ash treated therewith below the detectable limit. It is also known from these results that the treating agent containing silicon dioxide having a larger specific surface area or having a larger specific surface area per gram of the treating agent has a higher effect of passivating and sequestering lead.

EXAMPLE 16

80 parts by weight of ordinary portland cement were well mixed with 20 parts by weight of either of silicon dioxide (1) and silicon dioxide (4) shown in Table 3 above, to prepare treating agent (16-1) and treating agent (16-2), respectively. 50 g of fly ash containing a large amount of lead (lead content: 1300 mg/kg, amount of lead released from the non-treated fly ash: 87 mg/liter), that had been discharged from a city garbage incineration system, were kneaded with 7.5 g of either of treating agent (16-1) and treating agent (16-2), along with 30 g of water, and the resulting blends were cured for 7 days and were thus solidified. Afterwards, the thus-formed cakes were tested by a lead release test stipulated in Notification No. 13 of the Environment Agency, on the basis of which the effect of the treating agents for making the waste harmless was determined. The test results obtained are shown in Table 29 below. As an comparative example, 20 parts by weight of silicon dioxide (5) were mixed with 80 parts by weight of ordinary portland cement to prepare comparative agent (16-1). Using 15 g of this, the same fly ash as above was treated in the same manner. This was tested in the same manner and the test results are also shown in Table 29, which additionally has the amount of lead released from the non-treated fly ash.

TABLE 29

Result of Test for Release of Lead

| | Treating Agent | | | |
|---|---|---|---|---|
| | Type | Surface Area of Silicon Dioxide per Gram of Treating Agent ($m^2/g$) | Q4 Content (%) | Amount Added (g) | Amount of Lead Released (mg/liter) |
| Example 16-1 | Treating Agent 16-1 | 86 | 75.2 | 7.5 | 1.4 |
| Example 16-2 | Treating Agent 16-2 | 48 | 75.4 | 7.5 | 1.6 |
| Comparative Example 16-1 | Comparative Agent 16-1 | 24 | 86.7 | 7.5 | 2.1 |
| Non-treated Control | — | — | — | — | 40 |

From the test results shown in Table 29 above, it is known that when silicon dioxide having a smaller Q4 silicon atom content was used as the treating agent, the amount of lead released from the fly ash treated therewith was smaller. It is also known therefrom that the treating agent containing silicon dioxide having a surface area of more than 50 $m^2/g$, per gram of the treating agent, has a higher effect of stabilizing lead.

EXAMPLE 17

30 parts by weight of aluminium silicate (1) [surface potential (at a pH of 7 or higher): less than −15 mV], of which the physical properties and the surface potential have been shown in Table 2 and Table 4 above, were added to 70 parts by weight of ordinary portland cement to obtain treating agent (17-1). 50 g of fly ash containing a large amount of lead (amount of lead released from the non-treated fly ash: 90 mg/liter), that had been discharged from a city garbage incineration system, were kneaded with 10 g of treating agent (17-1) and 30 g of water, and the resulting blend was cured for 7 days and was thus solidified. Afterwards, the thus-formed cake was tested by a lead release test stipulated in Notification No. 13 of the Environment Agency, on the basis of which the effect of the treating agent for making the waste harmless was determined. The test results obtained are shown in Table 30 below. As an comparative example, 5 g of aluminium silicate (9), of which the physical properties and the surface potential have been shown in Table 2 and Table 5 above, were used as comparative agent (17-1), and the test results are also shown in Table 30 below, which additionally lists the amount of lead released from the non-treated fly ash and the amount of lead as regulated in Japan.

TABLE 30

Result of Test for Release of Lead

| | Treating Agent | | Amount of Lead |
|---|---|---|---|
| | Type | Amount Added (g) | Released (mg/liter) |
| Example 17-1 | Treating Agent 17-1 | 10 | 2.3 |
| Comparative Example 17-1 | Comparative Agent 17-1 | 10 | 11 |
| Non-treated Control | — | — | 90 |
| Regulated Value | — | — | <3 |

From the test results shown in Table 30 above, it is known that treating agent (17-1) of the present invention has an excellent effect of passivating and sequestering lead. Precisely, when treating agent (17-1) was used, the amount of lead released from the fly ash treated therewith was lowered to below the regulated value. As opposed to this, however, when comparative agent (17-1) containing aluminium silicate (9) having a surface potential of more than −14 mV at a pH of 7 or higher was used, the amount of lead released from the fly ash treated therewith was 11 mg/liter which is higher than the regulated value.

EXAMPLE 18

20 parts by weight of aluminium sulfate and 50 parts by weight of silicon dioxide (1) [surface potential (at a pH of 7 or higher): less than −15 mV], of which the physical properties and the surface potential have been shown in Table 3 and Table 6 above, were added to 30 parts by weight of ordinary portland cement to obtain treating agent (18-1). 20 parts by weight of aluminium sulfate and 50 parts by weight of aluminium silicate (9) were added to 30 parts by weight or ordinary portland cement to prepare comparative agent (18-1). 50 g of fly ash containing a large amount of lead (amount of lead released from the non-treated fly ash: 40 mg/liter), that had been discharged from a city garbage incineration system, were kneaded with 7.5 g of treating agent (18-1) and 30 g of water, and the resulting blend was cured for 7 days and was thus solidified. Afterwards, the thus-formed cake was tested by a lead release test stipulated in Notification No. 13 of the Environment Agency, on the basis of which the effect of the treating agent for making the waste harmless was determined. The test results obtained are shown in Table 31 below. As comparative examples, 5 g, 10 g or 15 g of comparative agent (18-1) were used, and the test results are also shown in Table 31 below, which additionally lists the amount of lead released from the non-treated fly ash and the amount of lead as regulated in Japan.

TABLE 31

Result of Test for Release of Lead

| | Treating Agent | | Amount of Lead |
|---|---|---|---|
| | Type | Amount Added (g) | Released (mg/liter) |
| Example 18-1 | Treating Agent 18-1 | 7.5 | <0.1 |

TABLE 31-continued

Result of Test for Release of Lead

| | Treating Agent | | Amount of Lead |
|---|---|---|---|
| | Type | Amount Added (g) | Released (mg/liter) |
| Comparative Example 18-1 | Comparative Agent 18-1 | 5 | 095 |
| Comparative Example 18-2 | | 10 | 0.45 |
| Comparative Example 18-3 | | 15 | 0.21 |
| Non-treated Control | — | — | 40 |
| Regulated Value | — | — | <3 |

From the test results shown in Table 31 above, it is known that treating agent (18-1) of the present invention has an excellent effect of passivating and sequestering lead. Precisely, when treating agent (18-1) was used, the amount of lead released from the fly ash treated therewith was lowered to below the detectable limit (0.1 mg/liter). As opposed to this, however, when comparative agent (18-1) containing aluminium silicate (9) having a surface potential of more than −14 mV at a pH of 7 or higher was used, the amount of lead released from the fly ash treated therewith could not be lowered to below the detectable limit even though the amount of the agent added was increased twice the amount of treating agent (18-1) of this invention.

EXAMPLE 19

10 parts by weight of aluminium sulfate, 20 parts by weight of aluminium silicate (1) shown in Table 2 above and 20 parts by weight of any one of various silicon dioxides shown in Table 3 above were well mixed along with 50 parts by weight of ordinary portland cement to obtain treating agents (19-1) to (19-4) shown in Table 32 below.

TABLE 32

Compositions of Treating Agents (parts by weight)

| | Ordinary Cement | Aluminium Sulfate | Aluminium Silicate | Silicon Dioxide | |
|---|---|---|---|---|---|
| | | | | Type | Amount Added |
| Treating Agent 19-1 | 50 | 10 | 20 | Silicon Dioxide (1) | 20 |
| Treating Agent 19-2 | 50 | 10 | 20 | Silicon Dioxide (2) | 20 |
| Treating Agent 19-3 | 50 | 10 | 20 | Silicon Dioxide (3) | 20 |
| Treating Agent 19-4 | 50 | 10 | 20 | Silicon dioxide (4) | 20 |

50 g of fly ash containing a large amount of lead (amount of lead released from the non-treated fly ash: 120 mg/liter), that had been discharged from a city garbage incineration system, were kneaded with 15 g of any one of treating agents (19-1) to (19-4), along with 30 g of water, and the resulting blends were cured for 7 days and were thus solidified. Afterwards, the thus-formed cakes were tested by a lead release test stipulated in Notification No. 13 of the Environment Agency, on the basis of which the effect of the treating agents for making the waste harmless was determined. The test results obtained are shown in Table 33 below, which additionally lists the amount of lead released from the non-treated fly ash and the amount of lead as regulated in Japan.

TABLE 33

Result of Test for Release of Lead

| | Treating Agent | | Amount of Lead |
|---|---|---|---|
| | Type | Amount Added (g) | Released (mg/liter) |
| Example 19-1 | Treating Agent 19-1 | 7.5 | <0.01 |
| Example 19-2 | Treating Agent 19-2 | 7.5 | 0.03 |
| Example 19-3 | Treating Agent 19-3 | 7.5 | 0.16 |
| Example 19-4 | Treating Agent 19-4 | 7.5 | 0.03 |
| Non-treated Control | — | — | 120 |
| Regulated Value | — | — | <3 |

From the test results shown in Table 33 above, it is known that the treating agents of the present invention have an excellent effect of passivating and sequestering lead. Precisely, using the treating agents of the present invention, the amount of lead released from the high-lead fly ash, that releases 120 mg/liter of lead when it is not treated, was lowered to between 1/100 and 1/10 of the regulated value. From these results, it is also known that the combination of aluminium silicate and silicon dioxide gives waste-treating agents which are highly effective. Accordingly, in view of the production costs and the physical properties (bulk density, fluidity) of these treating agents, it is recommended to combine aluminium silicate and silicon dioxide at any desired proportion.

EXAMPLE 20

Comparative examples are first mentioned herein. Fly ash that had been discharged from a city garbage incineration system was collected in a bag filter, and this was subjected to a metal release test stipulated in Notification No. 13 of the Environment Agency. The result obtained is shown in Table 34 as Comparative Example 20-1. 15 g of ordinary portland cement were added to 50 g of the same fly ash as above and kneaded along with 30 g of water, and the resulting blend was cured for 7 days and was thus solidified. This was subjected to a metal release test stipulated in Notification No. 13 of the Environment Agency, and the result obtained is shown in Table 34 as Comparative Example 20-2.

Ordinary portland cement (produced by Ube Cement Co.) and aluminium sulfate (produced by Yashiro Chemical Co.) were mixed at a weight ratio of 50/50 to obtain a treating agent. Two kinds of aluminium sulfate, that had been produced in the same series but as different lots, were used herein. The results of the test using aluminium sulfate of one lot are shown as Comparative Example 20-3, while those of the test using aluminium sulfate of the other lot are as Comparative Example 20-4. The same metal release test as in Comparative Example 20-2 was carried out, while using any one of the above-mentioned treating agents in place of cement, and the results obtained are shown in Table 34 below. To evaluate the caking property of these treating agents, a caking test was carried out according to the process mentioned below. Precisely, about 200 g of each treating agent were put into a 500 ml-plastic container and left as they were for 5 days or 10 days, while a 5-kg weight was applied onto it. Afterwards, the treating agent was taken out from the container and sieved through a 2-mm-mesh sieve, and the amount of the cake (caked treating agent) remained on the sieve was weighed. The percentage (%) of the weight of the cake thus measured, relative to the weight of the fresh treating agent, was obtained, from which the caking property of the treating agent tested was evaluated. A treating agent having a lower percentage of the cake is better. The test results are shown in Table 34 below.

Comparing the results of Comparative Example 20-3 with those of Comparative Example 20-4, it is known that the caking property of aluminium sulfate products produced by the same manufacturer in different lots significantly varies. This is considered to be because of the delicate conditions for production and storage would have an influence on the surface condition, etc. of these aluminium sulfate products. At present, however, details of the reasons for this are not clear. In the present Example 20, therefore, aluminium sulfate of the same lot as that used in Comparative Example 20-4 or, that is, the easily caking aluminium sulfate was used in order to distinctly demonstrate the effect of the present invention.

EXAMPLE 20-1 TO EXAMPLE 20-5

Ordinary portland cement (produced by Ube Cement Co.), aluminium sulfate (produced by Yashiro Chemical Co.) and a caking inhibitor were mixed at a ratio of 50/50/10 by weight to prepare treating agents. As the caking inhibitor, used were silica gel, activated clay, calcium stearate, activated alumina and aluminium stearate, in Examples 20-1 to Examples 20-5, respectively. The same metal release test as that in Comparative Example 20-2 was carried out, using each of these treating agents prepared above, in place of cement. The test results obtained are shown in Table 34 below. In addition, the same caking test as that in Comparative Examples 20-3 and 20-4 was carried out, using these treating agents. The test results obtained are shown in Table 34 below.

EXAMPLE 20-6

5 parts by weight of palm oil that had been dissolved in tetrahydrofuran were mixed with 100 parts by weight of aluminium sulfate, and the tetrahydrofuran was removed from the resulting mixture in vacuum. This was mixed with cement at a ratio of 55/50 by weight to prepare a treating agent. This treating agent was subjected to the same metal release test and the same caking test as those mentioned above. The test results obtained are shown in Table 34.

EXAMPLE 20-7

Ordinary portland cement (produced by Ube Cement Co.), aluminium sulfate (produced by Yashiro Chemical Co.) and calcium stearate were mixed at a ratio of 50/50/5 by weight to prepare a treating agent, which was subjected to the same metal release test and the same caking test as those mentioned above. The test results obtained are shown in Table 34.

TABLE 34

Results of Caking Test and Lead Release Test

|  | Caking Inhibitor | Result of Caking Test (%) After 5 days | Result of Caking Test (%) After 10 days | Amount of Lead Released (mg/liter) |
| --- | --- | --- | --- | --- |
| Comparative Example 20-1 | — | — | — | 493 |
| Comparative Example 20-2 | — | 1 | 3 | 13 |
| Comparative Example 20-3 | — | 1 | 3 | 0.3 |
| Comparative Example 20-4 | — | 98 | 99 | 0.3 |
| Example 20-1 | Silica Gel | 11 | 8 | 0.5 |
| Example 20-2 | Activated Clay | 5 | 4 | 0.2 |
| Example 20-3 | Calcium Stearate | 4 | 9 | |
| Example 20-4 | Activated Aluminium | 3 | 5 | 0.2 |
| Example 20-5 | Aluminium Stearate | 20 | 95 | 0.3 |
| Example 20-6 | Palm Oil | 19 | 22 | 0.9 |
| Example 20-7 | Calcium Stearate | 43 | 96 | 0.6 |

The test results of Comparative Example 20-2, Comparative Example 20-3, Comparative Example 20-4 and Examples 20-1 to 20-7 shown in Table 34 above demonstrate that the amount of lead released from the fly ash treated with cement was greatly lowered as compared with that released from the non-treated fly ash. This, however, is not satisfactory, while the amount of lead released from the fly ash treated with any one of the treating agents of the present invention was lowered to less than 1 mg/liter; although this more or less varies depending on the kind and the amount of the caking inhibitor added thereto. Thus, these verify the significance of the addition of the solid acid to the waste-treating agent to give the ability to inhibit the release of metal from the fly ash treated with the agent. (In Comparative Examples 20-3 and 20-4, used were treating agents each containing a solid acid. Therefore, the release of lead from the fly ash treated with each of the agents was highly inhibited in these comparative examples. Since the anti-caking effect of the treating agents used is discussed herein as needed, these cases using these treating agents are intentionally referred to as comparative examples.) Comparing the results of Comparative Example 20-4 where the easily caking aluminium sulfate was used and those of Examples 20-1 to 20-7 where the same aluminium sulfate was used, the effect of the caking inhibitor in the treating agents of the present invention was verified by the caking test (anti-caking test). However, the anti-caking effect varied, depending on the kind and amount of caking inhibitor used, as is obvious from the comparison between Example 20-3 and Example 20-7. From this, it is known that the kind and the amount of the caking inhibitor to be added to the waste-treating agent of the present invention shall be appropriately selected. The results obtained herein thus demonstrate the effect of the waste-treating agents of the present invention of inhibiting the release of heavy metals from the waste treated therewith and also their anti-caking effect (stability during storage). From the results, therefore, these effects of the waste-treating agents of the present invention have become obvious.

EXAMPLE 21

60 or 70 parts by weight of ordinary portland cement (produced by Ube Cement Co.) were mixed with from 10 to 20 parts by weight of one or more of aluminium silicate having a specific surface area of 500 m²/g measured by a BET method, as a solid acid, and, as reducing agents, sodium thiosulfate (produced by Wako Pure Chemicals Co.), allophane (produced by Matsumura Industry Co.) and bentonite (produced by Kunimine Industrial Co.), to prepare the treating agents of the present invention. As a comparative example, 80 parts by weight or ordinary portland cement were mixed with 20 parts by weight of aluminium silicate to prepare comparative agent (21-1). The compositions of the thus-prepared agents are shown in Table 35 below.

TABLE 35

Compositions of Treating Agents (parts by weight)

| Kind of Treating Agent | Cement | Aluminium Silicate | Sodium Thiosulfate | Ben-Allophane | tonite |
|---|---|---|---|---|---|
| Treating Agent 21-1 | 70 | 20 | 10 | — | — |
| Treating Agent 21-2 | 70 | 20 | — | 10 | — |
| Treating Agent 21-3 | 70 | 20 | — | — | 10 |
| Treating Agent 21-4 | 60 | 20 | 10 | 10 | — |
| Treating Agent 21-5 | 60 | 20 | 10 | — | 10 |
| Treating Agent 21-6 | 60 | 20 | — | 10 | 10 |
| Treating Agent 21-7 | 60 | 20 | 5 | 10 | 5 |
| Comparative Agent 21-1 | 80 | 20 | — | — | — |

50 g of fly ash containing a large among of lead, that had been discharged from a city garbage incineration system, were kneaded with 7.5 g of any one of these treating agents along with 30 g of water, and the resulting blends were cured for 7 days and were thus solidified. Afterwards, the thus-formed cakes were tested by a lead release test stipulated in Notification No. 13 of the Environment Agency, on the basis of which the effect of the treating agents for making the waste harmless was determined. The test results obtained are shown in Table 36 below, which additionally lists the amount of lead released from the fly ash treated with ordinary cement only as a comparative example, the amount of lead released for the non-treated fly ash and the amount of lead as regulated in Japan.

TABLE 36

Results of Test for Release of Lead

| | Treating Agent | Amount of Lead Released (mg/liter) |
|---|---|---|
| Example 21-1 | Treating Agent 21-1 | 0.43 |
| Example 21-2 | Treating Agent 21-2 | 0.15 |
| Example 21-3 | Treating Agent 21-3 | 0.28 |
| Example 21-4 | Treating Agent 21-4 | 0.12 |
| Example 21-5 | Treating Agent 21-5 | 0.20 |
| Example 21-6 | Treating Agent 21-6 | 0.12 |
| Example 21-7 | Treating Agent 21-7 | <0.1 |
| Comparative Example 21-1 | Comparative Agent 21-1 | 0.66 |
| Non-treated Control | — | 37 |
| Regulated Value | — | <3 |

The test results shown in Table 36 above demonstrate that the waste-treating agents of the present invention each additionally containing reducing agent(s), allophane and/or bentonite, in addition to the solid acid, aluminium silicate, have a further improved effect of stabilizing the heavy metals.

EXAMPLE 22

5 parts by weight of silica gel (produced by Wako Pure Chemicals Co.) were dispersed in 100 parts by weight of a solution of 100 g/liter of $H_3PO_4$. After having been stirred, this was filtered to obtain a cake. The cake was dried at 150° C. to prepare treating agent (22-1). On the other hand, treating agent (22-2) was prepared in the same manner as in the preparation of treating agent (22-1), except that sulfuric acid was used in place of the $H_3PO_4$ solution. 50 g of fly ash containing a large amount of lead, that had been discharged from a city garbage incineration system, were kneaded with 5 g, 7.5 g or 10 g of either of these treating agents along with 30 g of water, and the resulting blends were cured for 7 days to be solidified. Afterwards, the thus-formed cakes were tested by a lead release test stipulated in Notification No. 13 of the Environment Agency, on the basis of which the effect of the treating agents for making the waste harmless was determined. The test results obtained are shown in Table 37 below, which additionally lists the amount of lead released from the fly ash treated with ordinary cement only as Comparative Example 22-1, the amount of lead released from the non-treated fly ash and the amount of lead as regulated in Japan.

TABLE 37

Results of Test for Release of Lead

| | Treating Agent | Amount of Treating Agent Add (g) | Amount of Lead Released [mg/liter] |
|---|---|---|---|
| Example 22-1 | Treating Agent 22-1 | 5 | 2.8 |
| Example 22-2 | Treating Agent 22-1 | 7.5 | 1.4 |
| Example 22-3 | Treating Agent 22-1 | 10 | 0.8 |
| Example 22-4 | Treating Agent 22-2 | 5 | 3.2 |
| Exaxnple 22-5 | Treating Agent 22-2 | 7.5 | 1.8 |
| Example 22-6 | Treating Agent 22-2 | 10 | 1.0 |
| Comparative Example 22-1 | Cement | 10 | 3.7 |
| Non-treated Control | — | — | 53 |
| Regulated Value | — | — | <3 |

From the results in Table 37 above, it is known that the treating agents of the present invention have an excellent effect of passivating and sequestering lead. Precisely, the amount of lead released from the fly ash treated with any one of the treating agents of the present invention was smaller than that of lead released from the fly ash treated with cement only even though the amount of the treating agent of this invention added was smaller than that of cement added. Thus, the amount of lead released from the fly ash treated with any one of the treating agents of the present invention was smaller than the regulated value.

EXAMPLE 23

40 parts by weight of aluminium sulfate (produced by Wako Pure Chemicals Co.), aluminium silicate (produced by Wako Pure Chemicals Co.), silicon dioxide (produced by Shionogi & Co.) or aluminium phosphate were added to 60 parts by weight of ordinary portland cement (produced by Ube Cement Co.) and well mixed to obtain treating agents (23-1) to (23-4). 15 g of any one of these treating agents were added to 50 g of waste water sludge containing a large amount of copper, that had been discharged from a plating plant, then kneaded and the resulting blend was cured for 7 days and was thus solidified. Afterwards, the thus-formed cakes were tested to determine the effect of each treating agent for stabilizing the heavy metals in them. To measure the amounts of the heavy metals released from each cake, used was the CAM method (California Wet Extraction Test Method) which is employed in California of the United States of America. The test results are shown in Table 38 below.

TABLE 38

Amounts of Heavy Metals Released (mg/liter)

|  | Treating Agent | Heavy Metals | | | | | | |
| --- | --- | --- | --- | --- | --- | --- | --- | --- |
|  |  | Pb | Cd | Hg | Cr | Cu | Ni | Zn |
| Example 23-1 | Treating Agent 23-1 | 0.50 | <0.1 | 0.018 | 0.27 | 29 | 0.40 | 1.4 |
| Example 23-2 | Treating Agent 23-2 | 0.56 | 0.38 | 0.015 | 0.33 | 30 | 0.28 | 20 |
| Example 23-3 | Treating Agent 23-3 | 3.7 | 0.76 | 0.027 | 0.34 | 15 | 0.75 | 140 |
| Example 23-4 | Treating Agent 23-4 | 3.8 | 0.74 | 0.039 | 0.66 | 64 | 0.82 | 130 |
| Comparative Example 23-1 | Cement | 4.2 | 0.80 | 0.054 | 0.83 | 390 | 1.1 | 150 |
| Non-treated Control |  | 8.9 | 10 | 0.081 | 1.3 | 930 | 1.4 | 3000 |

From the test results shown in Table 38 above, it is known that the waste-treating agents of the present invention all have an excellent effect of stabilizing harmful metals. Thus, it is obvious that the method of using the waste-treating agents of the present invention is superior to the conventional method of using cement only. As is obvious from these, the treating agents of the present invention are effective for lowering not only the amount of lead to be released from waste cakes treated therewith but also the amounts of other metals such as cadmium, mercury, chromium, copper, nickel and zinc to be released from them.

What is claimed is:

1. A method for treating fly ash resulting from incineration of waste comprising at least one harmful substance selected from the group consisting of lead, cadmium, mercury, chromium, copper, nickel and zinc, said method consisting of the steps of:
   mixing said fly ash with a waste-treating agent consisting essentially of from 10 to 80% by weight of one or more solid acid or heat-treated solid acid, wherein the solid acid is produced by adhering sulfuric acid, phosphoric acid or malonic acid to silica gel, aluminum, diatomaceous earth, quartz or titanium oxide or the solid acid is selected from the group consisting of acid clay, Fuller's earth, montmorillonite, bentonite, kaolin, clarite, natural clay, polyanionic compounds, cation-exchange resins, ZnO, $Al_2O_3$, $TiO_2$, $CeO_2$, $As_2O_3$, $V_2O_5$, $SiO_2$, $Sb_2O_5$, $CoSO_4$, $NiSO_4$, $CuSO_4$, $MnSO_4$, $CdSO_4$, $SrSO_4$, $ZnSO_4$, $MgSO_4$, $FeSO_4$, $BaSO_4$, $KHSO_4$, $K_2SO_4$, $(NH_4)_2SO_4$, $Al_2(SO_4)_3$, $Fe_2(SO_4)_3$, $Cr_2(SO_4)_3$, $Ca(NO_3)_2.4H_2O$, $Bi(NO_3)_3.5H_2O$, $Zn(NO_3)_2.6H_2O$, $Fe(NO_3)_2.9H_2O$, $CaCO_3$, Zr phosphate, Ti phosphate, Al phosphate, Al silicate, $PbCl_2$, $HgCl_2$, $CuCl_2$, $AlCl_3$, $SnCl_2$, $CaCl_2$, $AgCl_3$, $H_2WO_4$, $AgClO_4$, $Mg(ClO_4)_2$, ZnS, and CaS, optionally with water, then kneading and curing.

2. The method for treating fly ash as claimed in claim 1, wherein said fly ash is alkaline fly ashes.

3. The method for treating fly ash as claimed in claim 1, wherein said solid acid is one or more selected from the group consisting of aluminium sulfate, aluminum silicates and silicon dioxide.

4. The method for treating fly ash as claimed in claim 1 wherein the treating agent further comprises a reducing agent, allophane, or bentonite as an auxiliary component.

5. The method for treating fly ash as claimed in claim 1 wherein the treating agent further comprises zeolite.

6. A method for treating fly ash resulting from incineration of waste comprising at least one harmful substance selected from the group consisting of lead, cadmium, mercury, chromium, copper, nickel and zinc, said method consisting of the steps of:
   mixing said fly ash with a waste-treating agent consisting essentially of cement and from 10 to 80% by weight of one or more solid acid or heat-treated solid acid, wherein the solid acid is produced by adhering sulfuric acid, phosphoric acid or malonic acid to silica gel, aluminum, diatomaceous earth, quartz or titanium oxide or the solid acid is selected from the group consisting of acid clay, Fuller's earth, montmorillonite, bentonite, kaolin, clarite, natural clay, polyanionic compounds, cation-exchange resins, ZnO, $Al_2O_3$, $TiO_2$, $CeO_2$, $As_2O_3$, $V_2O_5$, $SiO_2$, $Sb_2O_5$, $CoSO_4$, $NiSO_4$, $CuSO_4$, $MnSO_4$, $CdSO_4$, $SrSO_4$, $ZnSO_4$, $MgSO_4$, $FeSO_4$, $BaSO_4$, $KHSO_4$, $K_2SO_4$, $(NH_4)_2SO_4$, $Al_2(SO_4)_3$, $Fe_2(SO_4)_3$, $Cr_2(SO_4)_3$, $Ca(NO_3)_2.4H_2O$, $Bi(NO_3)_3.5H_2O$, $Zn(NO_3)_2.6H_2O$, $Fe(NO_3)_2.9H_2O$, $CaCO_3$, Zr phosphate, Ti phosphate, Al phosphate, Al silicate, $PbCl_2$, $HgCl_2$, $CuCl_2$, $AlCl_3$, $SnCl_2$, $CaCl_2$, $AgCl_3$, $H_2WO_4$, $AgClO_4$, $Mg(ClO_4)_2$, ZnS, and CaS, optionally with water, then kneading and curing.

7. A method for treating fly ash resulting from incineration of waste comprising at least one harmful substance selected from the group consisting of lead, cadmium, mercury, chromium, copper, nickel and zinc, said method consisting of the steps of:
   mixing said fly ash with a waste-treating agent consisting essentially of cement, a caking inhibitor, and from 10 to 80% by weight of one or more solid acid or heat-treated solid acid, wherein the caking inhibitor comprises one or more member selected from the group consisting of silica gel, diatomaceous earth, bentonite, activated clay, stearates, alkylamino acetates, palm oil acid clay, activated bauxite, activated alumina, acrylic resins, polyvinyl acetate, polyvinyl butyral, paraffin, sulfur, calcium carbonate, basic magnesium carbonate, calcium phosphate, kaolin, talc, ammonium iron citrate, potassium sulfate and aluminum silicate; and wherein the solid acid is produced by adhering sulfuric acid, phosphoric acid or malonic acid to silica gel, aluminum, diatomaceous earth, quartz or titanium oxide or the solid acid is selected from the group consisting of acid clay, Fuller's earth, montmorillonite, bentonite, kaolin, clarite, natural clay, polyanionic compounds, cation-exchange resins, $ZnO$, $Al_2O_3$, $TiO_2$, $CeO_2$, $As_2O_3$, $V_2O_5$, $SiO_2$, $Sb_2O_5$, $CoSO_4$, $NiSO_4$, $CuSO_4$, $MnSO_4$, $CdSO_4$, $SrSO_4$, $ZnSO_4$, $MgSO_4$, $FeSO_4$, $BaSO_4$, $KHSO_4$, $K_2SO_4$, $(NH_4)_2SO_4$, $Al_2(SO_4)_3$, $Fe_2(SO_4)_3$, $Cr_2(SO_4)_3$, $Ca(NO_3)_2.4H_2O$, $Bi(NO_3)_3.5H_2O$, $Zn(NO_3)_2.6H_2O$, $Fe(NO_3)_2.9H_2O$, $CaCO_3$, Zr phosphate, Ti phosphate, Al phosphate, Al silicate, $PbCl_2$, $HgCl_2$, $CuCl_2$, $AlCl_3$, $SnCl_2$, $CaCl_2$, $AgCl_3$, $H_2WO_4$, $AgClO_4$, $Mg(ClO_4)_2$, ZnS, and CaS, optionally with water, then kneading and curing.

8. The method of claim 7 wherein said caking inhibitor is a powdery inorganic substance.

9. The method of claim 7 wherein said caking inhibitor is an organic substance and is coated on the surfaces of the solid acid by spraying or dipping.

10. The method of claim 7 wherein said caking inhibitor is selected from the group consisting activated clay, activated alumina, calcium stearate and silica gel.

11. A method for treating fly ash resulting from incineration of waste comprising at least one harmful substance selected from the group consisting of lead, cadmium, mercury, chromium, copper, nickel and zinc, said method consisting of the steps of:

mixing said fly ash with a waste-treating agent consisting essentially of cement, an auxiliary component, and from 10 to 80% by weight of one or more solid acid or heat-treated solid acid;

wherein the auxiliary component is a member selected from the group consisting of a reducing agent, allophane, and bentonite; and wherein the solid acid is produced by adhering sulfuric acid, phosphoric acid or malonic acid to silica gel, aluminum, diatomaceous earth, quartz or titanium oxide or the solid acid is selected from the group consisting of acid clay, Fuller's earth, montmorillonite, bentonite, kaolin, clarite, natural clay, polyanionic compounds, cation-exchange resins, $ZnO$, $Al_2O_3$, $TiO_2$, $CeO_2$, $As_2O_3$, $V_2O_5$, $SiO_2$, $Sb_2O_5$, $CoSO_4$, $NiSO_4$, $CuSO_4$, $MnSO_4$, $CdSO_4$, $SrSO_4$, $ZnSO_4$, $MgSO_4$, $FeSO_4$, $BaSO_4$, $KHSO_4$, $K_2SO_4$, $(NH_4)_2SO_4$, $Al_2(SO_4)_3$, $Fe_2(SO_4)_3$, $Cr_2(SO_4)_3$, $Ca(NO_3)_2.4H_2O$, $Bi(NO_3)_3.5H_2O$, $Zn(NO_3)_2.6H_2O$, $Fe(NO_3)_2.9H_2O$, $CaCO_3$, Zr phosphate, Ti phosphate, Al phosphate, Al silicate, $PbCl_2$, $HgCl_2$, $CuCl_2$, $AlCl_3$, $SnCl_2$, $CaCl_2$, $AgCl_3$, $H_2WO_4$, $AgClO_4$, $Mg(ClO_4)_2$, ZnS, and CaS, optionally with water, then kneading and curing.

12. A method for treating fly ash resulting from incineration of waste comprising at least one harmful substance selected from the group consisting of lead, cadmium, mercury, chromium, copper, nickel and zinc, said method consisting of the steps of:

mixing said fly ash with a waste-treating agent consisting essentially of cement, a caking inhibitor, an auxiliary component, and from 10 to 80% by weight of one or more solid acid or heat-treated solid acid;

wherein the caking inhibitor comprises one or more member selected from the group consisting of silica gel, diatomaceous earth, bentonite, activated clay, stearates, alkylamino acetates, palm oil acid clay, activated bauxite, activated alumina, acrylic resins, polyvinyl acetate, polyvinyl butyral, paraffin, sulfur, calcium carbonate, basic magnesium carbonate, calcium phosphate, kaolin, talc, ammonium iron citrate, potassium sulfate and aluminum silicate;

wherein the auxiliary component is a member selected from the group consisting of a reducing agent, allophane, and bentonite; and wherein the solid acid is produced by adhering sulfuric acid, phosphoric acid or malonic acid to silica gel, aluminum, diatomaceous earth, quartz or titanium oxide or the solid acid is selected from the group consisting of acid clay, Fuller's earth, montmorillonite, bentonite, kaolin, clarite, natural clay, polyanionic compounds, cation-exchange resins, $ZnO$, $Al_2O_3$, $TiO_2$, $CeO_2$, $As_2O_3$, $V_2O_5$, $SiO_2$, $Sb_2O_5$, $CoSO_4$, $NiSO_4$, $CuSO_4$, $MnSO_4$, $CdSO_4$, $SrSO_4$, $ZnSO_4$, $MgSO_4$, $FeSO_4$, $BaSO_4$, $KHSO_4$, $K_2SO_4$, $(NH_4)2SO4$, $Al_2(SO_4)_3$, $Fe_2(SO_4)_3$, $Cr_2(SO_4)_3$, $Ca(NO_3)_2.4H_2O$, $Bi(NO_3)_3.5H_2O$, $Zn(NO_3)_2.6H_2O$, $Fe(NO_{32}.9H_2O$, $CaCO_3$, Zr phosphate, Ti phosphate, Al phosphate, Al silicate, $PbCl_2$, $HgCl_2$, $CuCl_2$, $AlCl_3$, $SnCl_2$, $CaCl_2$, $AgCl_3$, $H_2WO_4$, $AgClO_4$, $Mg(ClO_4)_2$, ZnS, and CaS, optionally with water, then kneading and curing.

13. A method for treating fly ash resulting from incineration of waste comprising at least one harmful substance selected from the group consisting of lead, cadmium, mercury, chromium, copper, nickel and zinc, said method consisting of the steps of:

mixing said fly ash with a waste-treating agent consisting essentially of cement, zeolite, and from 10 to 80% by weight of one or more solid acid or heat-treated solid acid;

wherein the solid acid is produced by adhering sulfuric acid, phosphoric acid or malonic acid to silica gel, aluminum, diatomaceous earth, quartz or titanium oxide or the solid acid is selected from the group consisting of acid clay, Fuller's earth, montmorillonite, bentonite, kaolin, clarite, natural clay, polyanionic compounds, cation-exchange resins, $ZnO$, $Al_2O_3$, $TiO_2$, $CeO_2$, $As_2O_3$, $V_2O_5$, $SiO_2$, $Sb_2O_5$, $CoSO_4$, $NiSO_4$, $CuSO_4$, $MnSO_4$, $CdSO_4$, $SrSO_4$, $ZnSO_4$, $MgSO_4$, $FeSO_4$, $BaSO_4$, $KHSO_4$, $K_2SO_4$, $(NH_4)_2SO_4$, $Al_2(SO_4)_3$, $Fe_2(SO_4)_3$, $Cr_2(SO_4)_3$, $Ca(NO_3)_2.4H_2O$, $Bi(NO_3)_3.5H_2O$, $Zn(NO_3)_2.6H_2O$, $Fe(NO_3)_2.9H_2O$, $CaCO_3$, Zr phosphate, Ti phosphate, Al phosphate, Al silicate, $PbCl_2$, $HgCl_2$, $CuC_2$, $AlCl_3$, $SnCl_2$, $CaCl_2$, $AgCl_3$, $H_2WO_4$, $AgClO_4$, $Mg(ClO_4)_2$, ZnS, and CaS, optionally with water, then kneading and curing.

14. A method for treating fly ash resulting from incineration of waste comprising at least one harmful substance selected from the group consisting of lead, cadmium, mercury, chromium, copper, nickel and zinc, said method consisting of the steps of:

mixing said fly ash with a waste-treating agent consisting essentially of cement, a caking inhibitor, zeolite, and from 10 to 80% by weight of one or more solid acid or heat-treated solid acid;

wherein the caking inhibitor comprises one or more member selected from the group consisting of silica gel, diatomaceous earth, bentonite, activated clay, stearates, alkylamino acetates, palm oil acid clay, activated bauxite, activated alumina, acrylic resins, polyvinyl acetate, polyvinyl butyral, paraffin, sulfur, calcium carbonate, basic magnesium carbonate, calcium phosphate, kaolin, talc, ammonium iron citrate, potassium sulfate and aluminum silicate; and wherein the solid acid is produced by adhering sulfuric acid, phosphoric acid or malonic acid to silica gel, aluminum, diatomaceous earth, quartz or titanium oxide or the solid acid is selected from the group consisting of acid clay, Fuller's earth, montmorillonite, bentonite, kaolin, clarite, natural clay, polyanionic compounds, cation-exchange resins, $ZnO$, $Al_2O_3$, $TiO_2$, $CeO_2$, $AS_2O_3$, $V_2O_5$, $SiO_2$, $Sb_2O_5$, $CoSO_4$, $NiSO_4$, $CuSO_4$, $MnSO_4$, $CdSO_4$, $SrSO_4$, $ZnSO_4$, $MgSO_4$, $FeSO_4$, $BaSO_4$, $KHSO_4$, $K_2SO_4$, $(NH_4)_2SO_4$, $Al_2(SO_4)_3$, $Fe_2(SO_4)_3$, $Ca(NO_3)_2 \cdot 4H_2O$, $Bi(NO_3)_3 \cdot 5H_2O$, $Zn(NO_3)_2 \cdot 6H_2O$, $Fe(NO_3)_2 \cdot 9H_2O$, $CaCO_3$, Zr phosphate, Ti phosphate, Al phosphate, Al silicate, $PbCl_2$, $HgCl_2$, $CuCl_2$, $AlCl_3$, $SnCl_2$, $CaCl_2$, $AgCl_3$, $H_2WO_4$, $AgClO_4$, $Mg(ClO_4)_2$, ZnS, and CaS, optionally with water, then kneading and curing.

* * * * *